(12) United States Patent
Pyle et al.

(10) Patent No.: US 8,332,643 B2
(45) Date of Patent: *Dec. 11, 2012

(54) ESTABLISHING SECURE MUTUAL TRUST USING AN INSECURE PASSWORD

(75) Inventors: Harry S. Pyle, Bellevue, WA (US); Bruce Louis Lieberman, Bellevue, WA (US); Daniel R. Simon, Seattle, WA (US); Guillaume Simonnet, Bellevue, WA (US); William Dollar, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/907,775

(22) Filed: Oct. 19, 2010

(65) Prior Publication Data

US 2011/0035593 A1 Feb. 10, 2011

Related U.S. Application Data

(63) Continuation of application No. 11/170,523, filed on Jun. 29, 2005, now Pat. No. 7,836,306.

(51) Int. Cl.
*H04L 29/06* (2006.01)

(52) U.S. Cl. ........ 713/169; 713/155; 713/156; 713/168; 380/278

(58) Field of Classification Search .................. 713/155, 713/156, 168, 169; 380/278
See application file for complete search history.

(56) References Cited

U.S. PATENT DOCUMENTS

| | | | |
|---|---|---|---|
| 4,672,376 A | 6/1987 | Lewiner et al. | |
| 4,980,679 A | 12/1990 | Klaubert | |
| 5,732,137 A | 3/1998 | Aziz | |
| 5,737,419 A | 4/1998 | Ganesan | |
| 6,009,177 A | 12/1999 | Sudia | |
| 6,134,327 A | 10/2000 | Van Oorschot | |
| 6,151,677 A | 11/2000 | Walter et al. | |
| 6,189,096 B1 | 2/2001 | Haverty | |
| 6,189,098 B1 | 2/2001 | Kaliski, Jr. | |

(Continued)

FOREIGN PATENT DOCUMENTS

GB 2434663 A * 8/2007

OTHER PUBLICATIONS

International Search Report for PCT/US2006/025340 dated Jan. 8, 2007, 3 pages.

(Continued)

*Primary Examiner* — Nathan Flynn
*Assistant Examiner* — Sarah Su
(74) *Attorney, Agent, or Firm* — Merchant & Gould P.C.

(57) ABSTRACT

A process for establishing secure mutual trust includes generating a one-time-password. The one-time-password is transferred between the devices in a communication occurring off of the network. Each device generates a set of authenticators by hashing a plurality of sub-strings of the password and the device's authentication certificate with a respective set of nonces. The devices exchange the respective sets of authenticators. Each device then alternates revealing its respective set of nonces and its authentication certificate in a multi-stage process. The devices re-calculate the authenticators based upon the respective set of nonces and authentication certificate revealed by the other device along with the one-time-password sub-strings that it posses. If each device determines that the authenticators re-calculated by the given device matches the authenticators previously received from the other device, secure mutual trust is established.

20 Claims, 14 Drawing Sheets

U.S. PATENT DOCUMENTS

| | | | |
|---|---|---|---|
| 6,198,096 | B1 | 3/2001 | Le Cocq |
| 6,198,098 | B1 | 3/2001 | Laou |
| 6,338,114 | B1 | 1/2002 | Paulsen et al. |
| 6,772,331 | B1 | 8/2004 | Hind et al. |
| 6,789,189 | B2 | 9/2004 | Wheeler et al. |
| 6,842,105 | B1 | 1/2005 | Henderson et al. |
| 6,886,069 | B2 | 4/2005 | Kawaura |
| 6,985,583 | B1 | 1/2006 | Brainard et al. |
| 7,028,908 | B2 | 4/2006 | Kuroda et al. |
| 7,051,102 | B2 | 5/2006 | Gupta et al. |
| 7,051,157 | B2 | 5/2006 | James |
| 7,110,836 | B2 | 9/2006 | Sturm et al. |
| 7,136,903 | B1 | 11/2006 | Phillips et al. |
| 7,197,565 | B2 | 3/2007 | Abdelaziz et al. |
| 7,302,256 | B1 | 11/2007 | O'Hara et al. |
| 7,350,038 | B2 | 3/2008 | Kikuchi et al. |
| 7,735,145 | B2 | 6/2010 | Kuehnel et al. |
| 7,836,306 | B2 | 11/2010 | Pyle et al. |
| 2001/0005883 | A1 | 6/2001 | Wray et al. |
| 2001/0055389 | A1* | 12/2001 | Hughes et al. ............ 380/44 |
| 2002/0166048 | A1 | 11/2002 | Coulier |
| 2003/0041244 | A1 | 2/2003 | Buttyan et al. |
| 2003/0097592 | A1 | 5/2003 | Adusumilli |
| 2003/0172280 | A1 | 9/2003 | Scheidt et al. |
| 2004/0049687 | A1 | 3/2004 | Orsini et al. |
| 2004/0064532 | A1 | 4/2004 | Schacht et al. |
| 2004/0199768 | A1 | 10/2004 | Nail |
| 2004/0230799 | A1 | 11/2004 | Davis |
| 2005/0033960 | A1* | 2/2005 | Vialen et al. .............. 713/170 |
| 2005/0193103 | A1 | 9/2005 | Drabik |
| 2006/0064588 | A1* | 3/2006 | Tidwell et al. ............ 713/169 |
| 2006/0080352 | A1 | 4/2006 | Boubez et al. |
| 2006/0111080 | A1 | 5/2006 | Bajar et al. |
| 2006/0177061 | A1* | 8/2006 | Orsini et al. .............. 380/268 |
| 2006/0236409 | A1 | 10/2006 | Kuehnel et al. |
| 2006/0291663 | A1 | 12/2006 | Aissi et al. |
| 2007/0005955 | A1 | 1/2007 | Pyle et al. |
| 2007/0067618 | A1* | 3/2007 | Sandhu et al. ............ 713/155 |
| 2007/0255959 | A1* | 11/2007 | Jung et al. ................ 713/183 |
| 2008/0005562 | A1 | 1/2008 | Sather et al. |
| 2008/0046728 | A1 | 2/2008 | Lyle |
| 2008/0123850 | A1 | 5/2008 | Bhatnagar et al. |
| 2008/0155260 | A1* | 6/2008 | Perez et al. ............... 713/169 |
| 2008/0229104 | A1 | 9/2008 | Ju et al. |
| 2009/0268911 | A1* | 10/2009 | Singh ......................... 380/270 |
| 2010/0005297 | A1 | 1/2010 | Ganesan |
| 2010/0042839 | A1 | 2/2010 | Ho |
| 2010/0131761 | A1 | 5/2010 | Kim et al. |
| 2010/0161966 | A1* | 6/2010 | Kwon et al. ............... 713/155 |
| 2011/0051927 | A1* | 3/2011 | Murray et al. ............. 380/28 |
| 2012/0087490 | A1* | 4/2012 | Ollikainen et al. ........ 380/28 |

OTHER PUBLICATIONS

International Preliminary Report on Patentability for PCT/US2006/025340 dated Jan. 9, 2008, 4 pages.

Kim et al., Design and Implementation of Home Network Systems Using UPnP Middleware for Networked Appliances, 2002, IEEE, pp. 963-972.

U.S. Appl. No. 11/062,261, Advisory Action mailed Jul. 27, 2009, 3 pgs.

U.S. Appl. No. 11/062,261, Amendment and Response filed Jan. 4, 2010, 11 pgs.

U.S. Appl. No. 11/062,261, Amendment and Response filed Mar. 3, 2009, 12 pgs.

U.S. Appl. No. 11/062,261, Amendment and Response filed Jul. 8, 2009, 16 pgs.

U.S. Appl. No. 11/062,261, Amendment and Response filed Aug. 25, 2009, 7 pgs.

U.S. Appl. No. 11/062,261, Notice of Allowance mailed Jan. 26, 2010, 7 pgs.

U.S. Appl. No. 11/062,261, Office Action mailed May 26, 2009, 24 pgs.

U.S. Appl. No. 11/062,261, Office Action mailed Sep. 3, 2008, 18 pgs.

U.S. Appl. No. 11/062,261, Office Action mailed Sep. 4, 2009, 15 pgs.

U.S. Appl. No. 11/170,523, Amendment and Response filed Dec. 16, 2009, 15 pgs.

U.S. Appl. No. 11/170,523, Amendment and Response filed Apr. 20, 2010, 8 pgs.

U.S. Appl. No. 11/170,523, Notice of Allowance mailed Jul. 9, 2010, 9 pgs.

U.S. Appl. No. 11/170,523, Office Action mailed Jan. 20, 2010, 8 pgs.

U.S. Appl. No. 11/170,523, Office Action mailed Nov. 21, 2008, 22 pgs.

U.S. Appl. No. 11/170,523, Office Action mailed 16/19/2009, 21 pgs.

U.S. Appl. No. 11/301,858, Office Action mailed May 26, 2009, 22 pgs.

U.S. Appl. No. 11/170,523, Amendment and Response filed Mar. 20, 2009, 37 pgs.

U.S. Appl. No. 11/170,523, Office Action mailed Jun. 19, 2009, 21 pgs.

* cited by examiner

ESTABLISHING SECURE MUTUAL TRUST USING AN INSECURE PASSWORD

CROSS-REFERENCE TO RELATED APPLICATIONS

This application is a continuation application and claims priority to U.S. patent application Ser. No. 11/170,523, filed Jun. 29, 2005, entitled "ESTABLISHING SECURE MUTUAL TRUST USING AN INSECURE PASSWORD," which application is incorporated herein by reference in its entirety.

BACKGROUND

Computer networks are subject to ever increasing security risks. To protect against attacks some network security protocols utilize public-key encryption techniques for secure communication. Public-key techniques use two separate keys—a public key which is made public for others to use and a private key that is only known to its owner. Each user generates a pair of keys to be used for encryption and decryption of message. A device's private key is kept secure and the public key is available to all users. If a first user wishes to send a private message to a second user, the first user encrypts the message using the second user's public key. When the second user receives the message, the second user decrypts it using its private key.

Alternatively, the public-key technique may be utilized to authenticate the sender of the message, instead of securely exchanging the message. In particular, the first user encrypts the message using its own private key. When the second user receives the message, the second user decrypts it using the first user's public key. It is appreciated that no other user but the first user could have generated the encrypted message. Thus, the entire encrypted message serves as a digital signature. In addition it is not possible to alter the message without the first user's private key, so the message is authenticated both in terms of source and in terms of data integrity.

In yet another implementation, a portion of the message is encrypted to generate an authenticator. The authenticator is sent with the unencrypted message. If the authenticator is encrypted with the private key of the first user, the authenticator serves as a signature that may be utilized to verify the origin and content of the message.

In all of the implementations, a method of authenticating the public key of a given device is needed when using public key techniques. Typically, a trusted third party (e.g., certificate authority) verifies the identity of entities, such as individuals and devices. A unique digital certificate is issued to each authenticated entity which confirm their identity. The certificate typically contains the device identifier of the certificate holder, a serial number, expiration dates, a copy of the certificate holder's public key and the digital signature of the certificate-issuing authority so that a recipient can verify that the certificate is real.

A recipient of an encrypted message uses the certificate authority's public key to decode the digital certificate attached to the encrypted message. The receiving device verifies that the digital certificate was issued by the certificate authority and then obtains the sender's public key and identification information encoded in the certificate. With this information, the recipient can securely communicate on the network with the other device.

The trusted third party, however, adds a significant amount of overhead in small networks and/or networks implementing a modest level of security. A certificate authority can be eliminated and mutual trust can be established directly between the devices if the certificates are transferred outside of the network (e.g., output-of-band transfer of certificates). However, to achieve a reasonable level of security the certificates need to be a large sequence of bits, typically 1024-bits or more. As a result of their length the digital certificates are not readily remembered by users, making manual transfer difficult. Furthermore, the manual transfer of certificates is also difficult if the devices are separated by large distances (e.g., in another building, across town, in another country). Accordingly, it is not practical for a user to manually transfer certificates between devices. Nor can the certificates always be transferred by a portable computer-readable medium (e.g., floppy disk, USB key, SD Flash, portable memory card or the like) because the devices may not have a common portable computer-readable medium interface.

SUMMARY

The techniques described herein are directed toward establishing secure mutual trust between devices over a network using an insecure password. In one embodiment, the password is acquired by both devices in an exchange off of the network (e.g., out-of-band transfer). The devices then exchange bit-commit cryptographic encodings of the password and authentication certificates. Each device step-wise reveals, to the other device, its digital certificate and the keys used in the bit-commit cryptographic primitive. Each device step-wise verifies the other device's certificate by recalculating the bit-commit cryptographic encodings based upon the revealed certificate and keys. Accordingly, each device verifies that the other device knew the password and the respective authentication certificate at the time that the bit-commit cryptographic encodings were exchanged.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Systems and methods are described herein for establishing secure mutual trust between two devices using an insecure password. The password is transferred outside of the network (e.g., out-of-band) from one device to the other. The password is leveraged by each device to securely exchange authentication certificates over the network. The authentication certificates are then step-wise revealed to verify that they were successfully exchanged between the intended devices. The password is insecure in the sense that it is short. However, a relatively high level of security is achieved by utilizing the password to exchange the authentication certificates.

Figure 1:
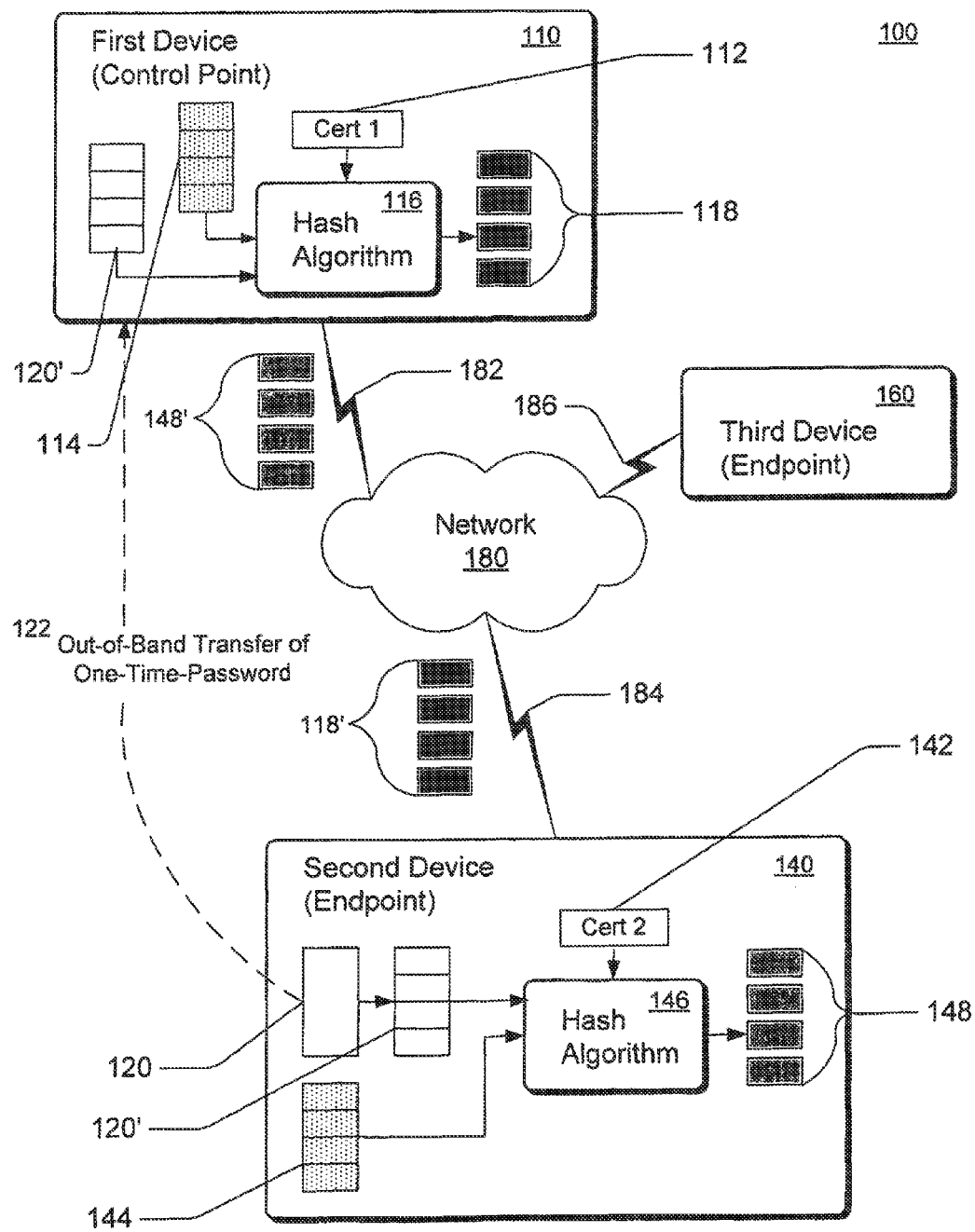
FIGS. 1, 2 and 3 show a block diagram of a system for implementing secure mutual trust between devices using an insecure password.
Figure 2:
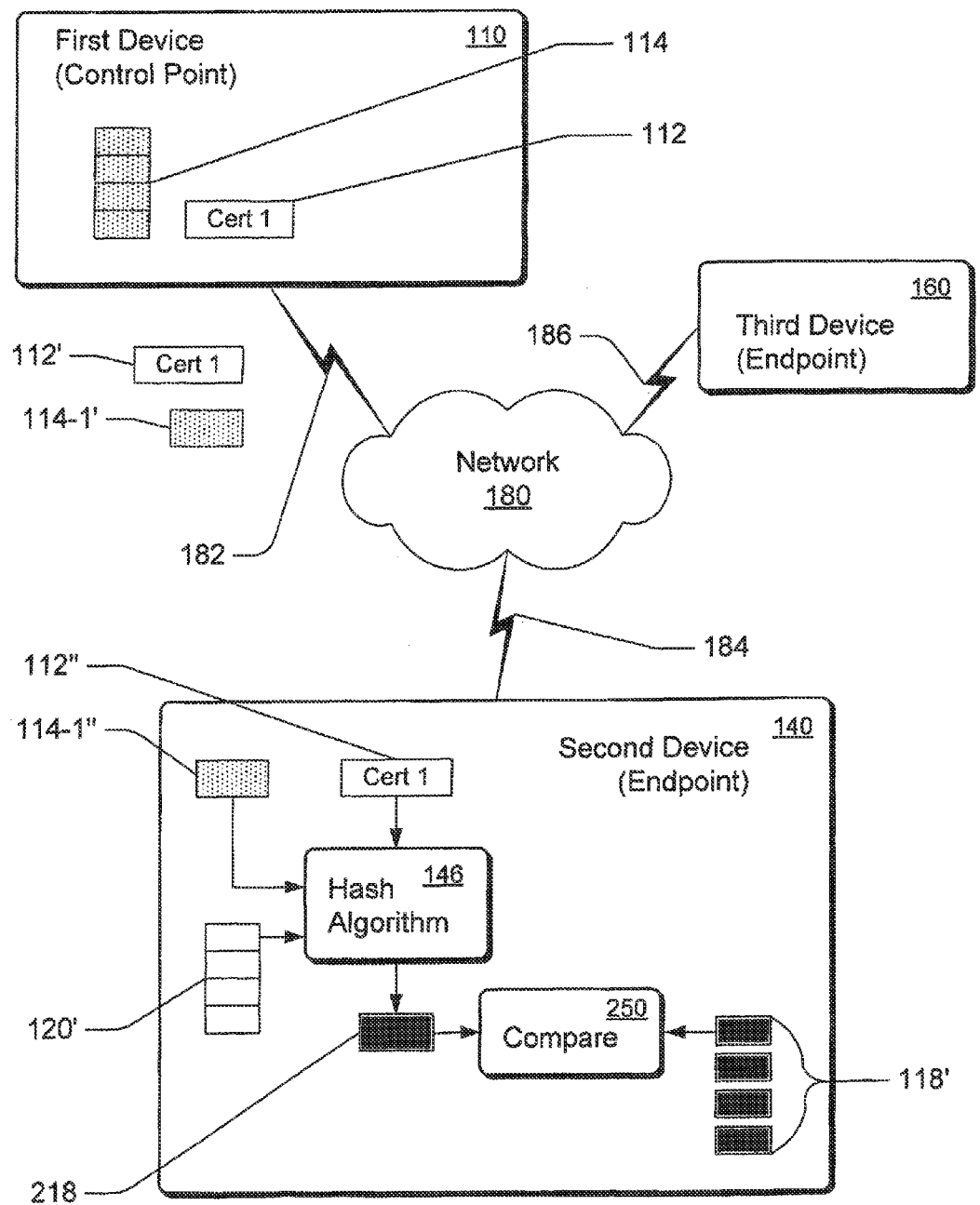
Figure 3:
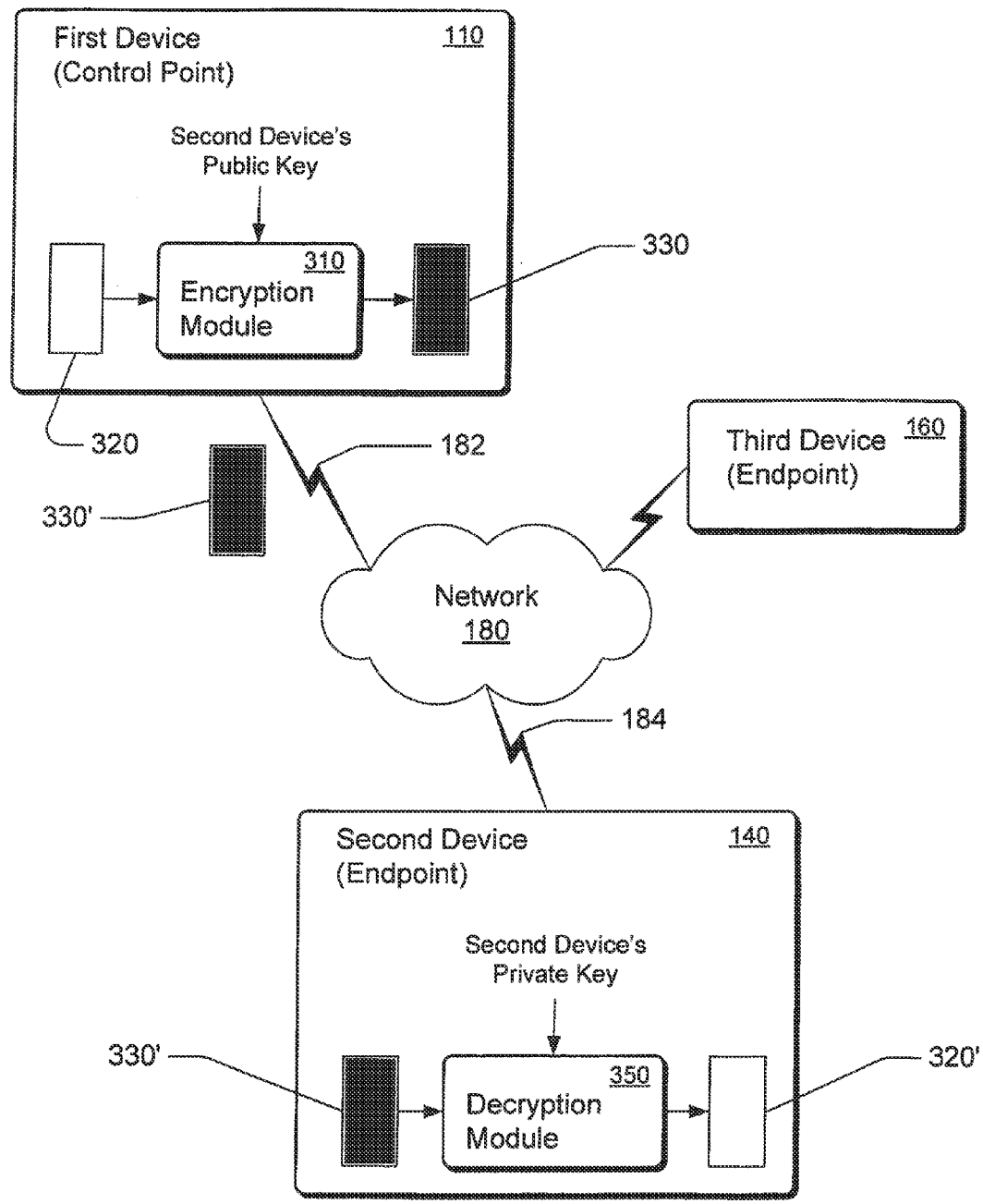

FIGS. 1, 2 and 3 show a system for implementing secure mutual trust between devices using an insecure password. The system includes a plurality of computing and/or electronic devices 110, 140, 160 communicatively coupled to each other. In one implementation, the devices 110, 140, 160 may be communicatively coupled by one or more communication channels 182, 184, 186 directly or through one or more networks 180. The networks 180 may include local area networks, wide area networks, intranets, extranets, the Internet and/or the like.

A first device 110 may be a control point device (e.g., host), such as a personal computer, server computer, client computer, hand-held or laptop device, set top box, programmable consumer electronic, or similar device. A second device 140 may be an endpoint device (e.g., responder), such as a personal computer, server computer, client computer, hand-held or laptop device, set top box, programmable consumer electronic, or similar device. In an exemplary implementation, the first device may be a personal computer and the second device may be an electronic appliance, such as a microwave oven, multimedia digital recorder, security system or the like. The personal computer is communicatively coupled to the appliance by a home network. In one implementation, the devices may be universal plug-and-play (UPnP) devices.

Mutual trust can be established between the first and second devices 110, 140 utilizing an insecure one-time-password 120 generated each time trust establishment is attempted. The password 120 is generated by the second device 140 and transferred to the first device 110 out-of-band 122. The out-of-band transfer 122 may be any transfer that does not occur over the network 180. In one implementation, a user manually transfers 122 a short or medium sized password 120 from the endpoint device to the control point device.

The one-time-password 120 is then leveraged to securely exchange the authentication certificates 112, 142 of the devices 110, 140 over the network 180 and to verify that the certificates were successfully exchanged between the intended devices 110, 140. Each device's digital certificate 112, 142 contains information that establishes the credentials of the device 110, 140. The information includes the device's public key and a variety of other identification information. In one implementation, the digital certificates 112, 142 are X509 V3 certificates.

A bit-commit cryptographic primitive is utilized to securely exchange the password 120 and digital certificate 112, 142 of the given device 110, 140. More specifically, the one-time-password 120 is decomposed by each device 110, 140 into a plurality of password sub-strings 120'. Each device also generates its own set of random numbers 114, 144. Each random number, in the respective set 114, 144, is logically paired with a password sub-string 120'. The respective certificate 112, 142 is then hashed 116, 146 with each one of the corresponding pairs of random numbers 114, 144 and the password sub-strings 120' to generate a corresponding set of authenticators 118, 148. The respective sets of authenticators 118', 148' are exchanged by the devices 110, 140.

In a second implementation (not shown), each device generates its own confirmation random number. The respective certificate 112, 142 is then hashed 116, 146 with the corresponding random number and one-time-password 120 to generate a corresponding confirmation authenticator. The devices 110, 140 then exchange the respective confirmation authenticators along with the device's certificate 112, 142.

Referring now to FIG. 2, the devices 110, 140 then iteratively reveal each random number generated by the given device along with the device's certificate 112, 142. More specifically, the first device 110 may reveal its first random number 114-1' that it generated along with its certificate 112'. The second device 140 recalculates the second device's first authenticator 218 using the random number 114-1" and certificate 112" revealed by the first device 110. The second device 140 verifies that the recalculated authenticator 218 matches the corresponding authenticator 118' previously received from the first device. The second device 140 then reveals its first random number along with its certificate, if the other device's 110 certificate was successfully verified in the previous step. The first device 110 recalculates the first authenticator using the random number and certificate revealed by the second device 140. The first device 110 verifies that the recalculated authenticator matches the corresponding authenticator previously received from the second device 140. The step-wise process of verifying authenticators is performed for each set of authenticators generated by each device. If all of the authenticators are verified, secure mutual trust is established between the devices 110, 140.

In the second implementation (not shown), each device generates its own set of validation nonces. Each validation nonce, in the respective set, is logically paired with a password sub-string 120'. The respective certificate 112, 142 is then hashed 116, 146 with each one of the corresponding pairs of validation nonces and the password sub-strings 120' to generate a corresponding set of validation authenticators. The devices 110, 140 exchange each one of the set of validation authenticators and then iteratively reveal the respective one of the set of validation nonces. More specifically, the first device 110 transfers its set of validation authenticators to the second device 140. The second device 140 then transfers its set of validation authenticators to the first device 110. The first device 110 then reveals the first one of its set of validation nonces to the second device. The second device 140 recalculates the first device's corresponding validation authenticator using the validation nonces and certificate 112 revealed by the first device 110. The second device 140 verifies that the recalculated validation authenticator matches the corresponding validation authenticator received from the first device 110. The second device 140 then reveals the first one of its set of validation nonces, if the first device's certificate was successfully verified in the previous step. The first device 110 recalculates the first validation authenticator using the validation nonce and certificate revealed by the second device 140. The first device 110 verifies that the recalculated validation authenticator matches the corresponding validation authenticator previously received from the second device 140. The step-wise process of verifying the validation authenticators is performed for each validation authenticator generated by each device 110, 140.

In the second implementation (not shown), if all of the validation authentication generated by the second device 140 are verified, the first device 110 reveals the confirmation nonces that it previously generated. The second device 140 recalculates the confirmation authenticator using the confirmation nonce and certificate revealed by the first device 110. The second device 140 verifies that the recalculated confirmation authenticator matches the corresponding confirmation authenticator previously received from the first device 110. If all of the validation authenticators generated by the first device 110 are verified, the second device 140 then reveals the confirmation nonces that it previously generated. The first device 110 recalculates the confirmation authenticator using the confirmation nonce and certificate revealed by the second device 140. The first device 110 verifies that the recalculated confirmation authenticator matches the corresponding confirmation authenticator previously received from the second device 140. If both of the confirmation authenticators are verified, secure mutual trust is established between the devices 110, 140.

In both implementations, the digital certificates 112, 142 are not authenticated by a trusted third part and therefore may have any format. Furthermore, it is appreciated that the one-time-password 120 may be any length and may be decomposed into any number of sub-strings 120'. The length of the one-time-password 120 and the number of sub-strings 120' may be selected based upon the level of security required by a particular application. Generally, a one-time-password 120 decomposed into a large number of sub-strings 120' provides more security than the same password 120 decomposed into a smaller number of substrings 120'. While it may be easier for an attacker to guess a shorter sub-string 120', the attacker only acquires a smaller portion of the one-time-password 120 if divided into a larger number of strings. For example, if the password 120 is eight digits long and is divided into four sub-strings 120', there is a one-in-one hundred chance of guessing a subs-string 120'. However, if the attacker guesses correctly, only 25% of the one-time-password 120 is acquired by the attacker. If the password is divided into two sub-strings 120', there is a one-in-ten thousand chance of guessing a sub-string. However, if the attacker guesses correctly, they acquire 50% of the one-time-password 120. Similarly, while an attacker can steal a first sub-string 120' by initiating the establishment of trust, the attacker acquires a smaller portion of the one-time-password 120 if it is divided into a larger number of sub-strings 120'. Thus, if an attacker steals the first sub-string 120' and guess correctly once, security is compromised if the password 120 was divided into two sub-strings 120'. However, only 50% of the one-time-password 120 is acquired by the attacker if the password 120 was divided into four sub-strings 120'.

Once secure mutual trust is established, the public keys contained in the certificates 112, 142 may be utilized by the devices 110, 140 to securely communicate across the network 180. The secure communication may utilize any conventional public-key based communication protocol. For example, the first device 110 may encrypt 310 a message 320 using the second device's public key, as illustrated in FIG. 3. The encrypted message 330 is transmitted across the network 180 and received by the second device 140. The second device 140 decrypts 350 the message 330' using its private key to yield message 320'. Accordingly, the message 330' transmitted across the network 180 is encrypted and no other device 160 can decrypt the message 330'. In another implementation (not shown), the first device 110 may utilize its own private key to encrypt the message, which would allow any device in possession of the first device's 110 public key to decrypt the message and authenticate that it was sent by the first device 110. In yet another implementation (not shown), the first device 110 may generate an authenticator utilizing the device's private key. The authenticator is appended to the message and transmitted across the network 180. Accordingly, the second device 140 can verify that the first device 110 sent the message and it has not been modified during transmission.

Figure 4:
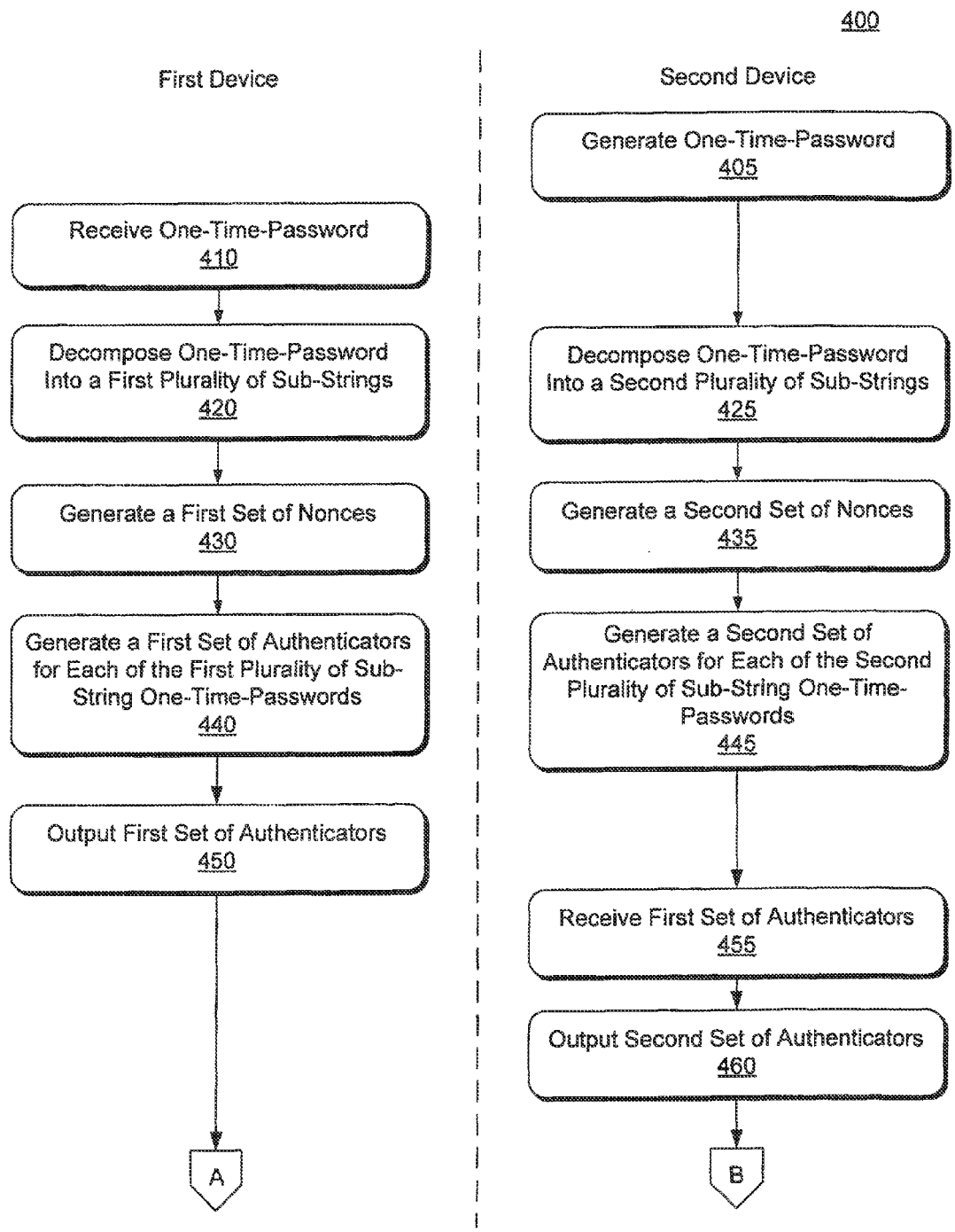
FIGS. 4, 5 and 6 show a flow diagram of a method of establishing secure mutual trust by a first device and a second device using an insecure password.
Figure 5:
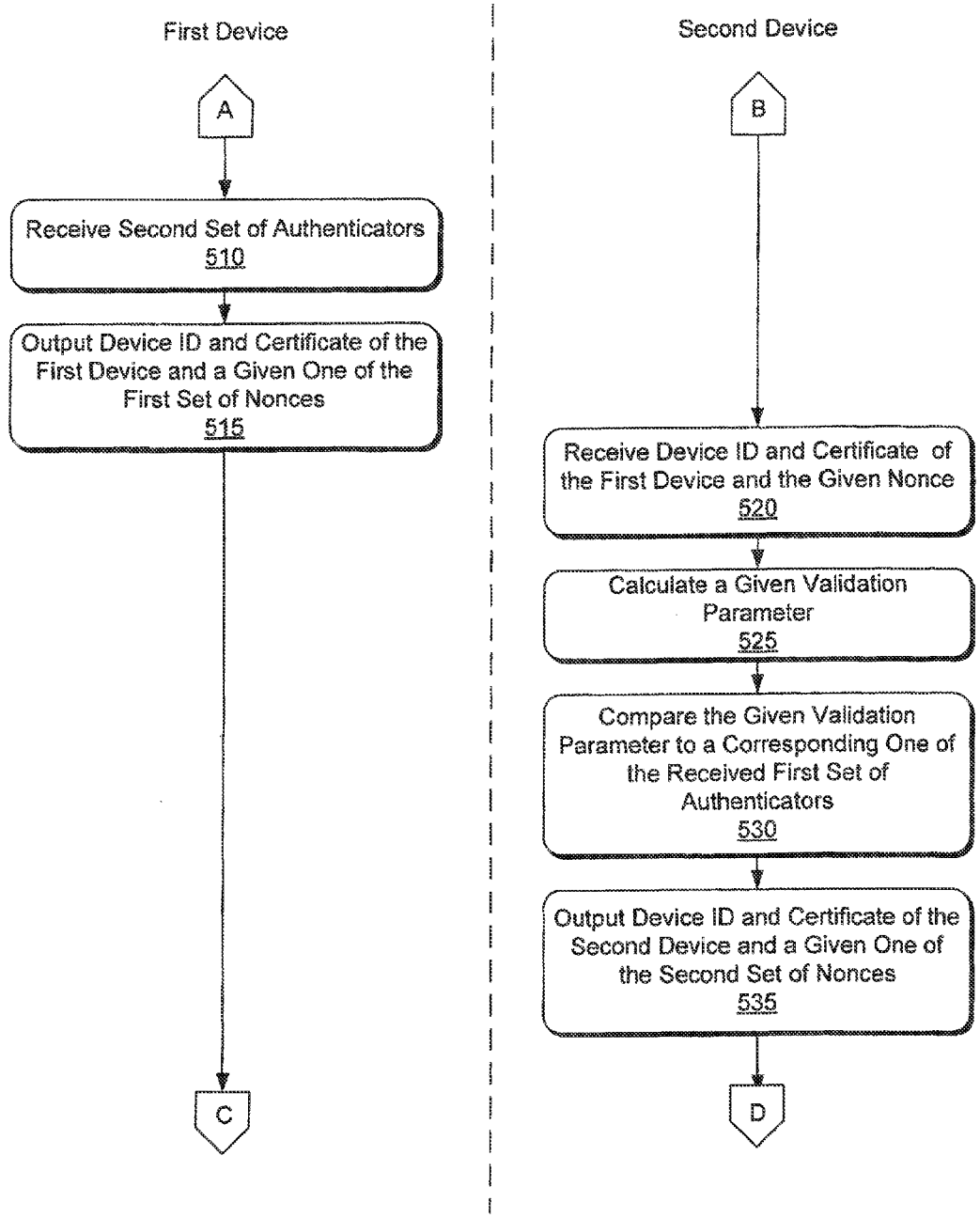
Figure 6:
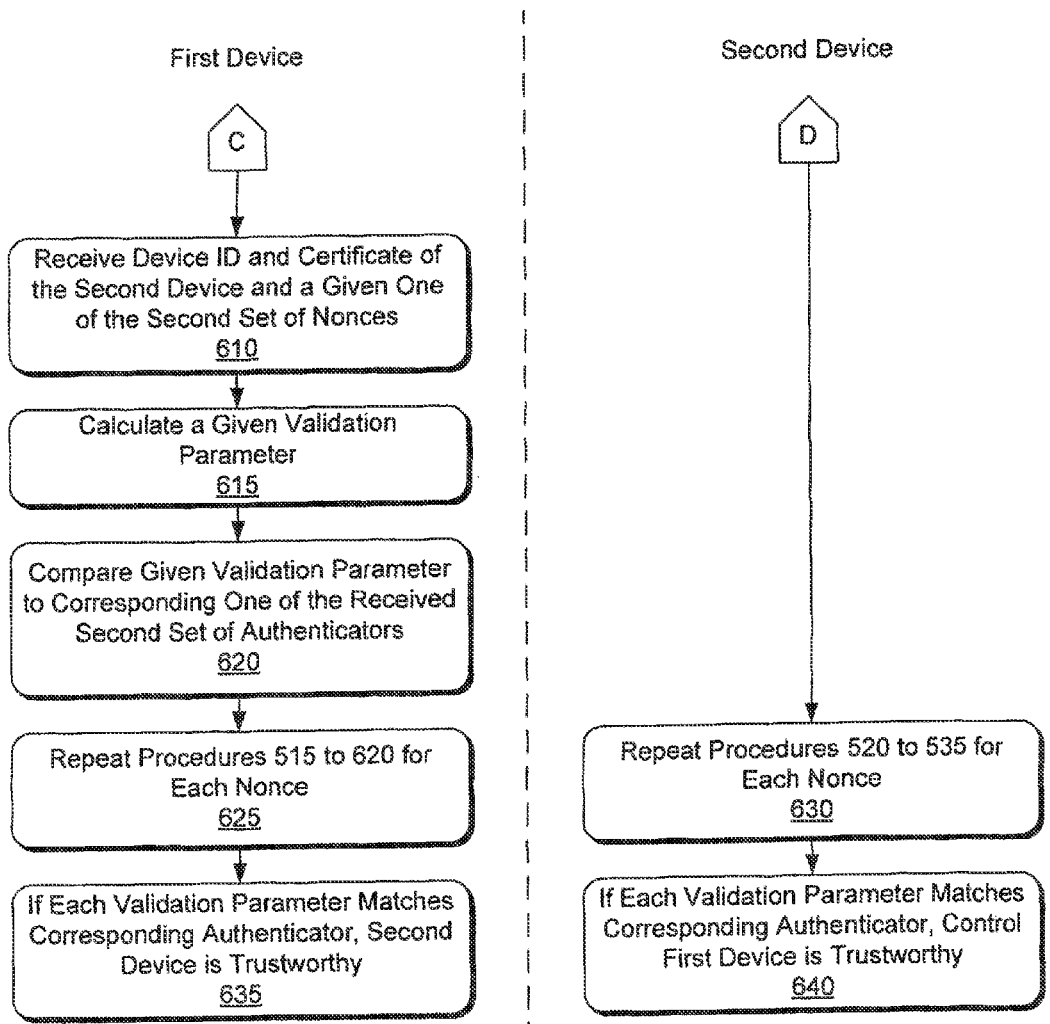

FIGS. 4, 5 and 6 show a method of establishing secure mutual trust by a first device and a second device using an insecure password. The method includes a password generation and out-of-band transfer stage, an information exchange stage and a validation stage. The method may also include a confirmation stage. Referring to FIG. 4, the method begins with generation of a one-time-password (OTP) by the second device (e.g., endpoint device), at 405. The one-time-password is randomly generated each time trust establishment is attempted. The one-time-password may be a string of a plurality of characters, numbers or the like. In one implementation, the one-time-password is a four digit decimal number. At 410, the one-time-password is received by the first device (e.g., control point device), via an out-of-band transfer. The out-of-band transfer may be any transfer that does not occur over the network. In an implementation for establishing secure mutual trust between an electronic appliance and a computer, the one-time-password is output on the display of an electronic appliance and a user manually enters it into the computer.

At 420, the first device decomposes the one-time-password into a first plurality of password sub-strings ($OTP_1$-$OTP_N$). At 425, the second device decomposes the one-time-password into a second plurality of password sub-strings. Each sub-string is a portion of the password. The first and second set of password sub-strings are equivalent but possessed by the respective devices. In one implementation, the four-digit decimal number password is decompressed by each device into four sub-strings of one decimal digit each. In other implementations, the one-time-password may be eight decimal digits and may be decomposed into four sub-strings of two decimal digits each, the one-time-password may be six characters and may be decomposed into three sub-strings of two characters each, or any similar variation. The length of the password and the number of sub-strings that it is decomposed into should be selected based upon a desired level of security and acceptable increase in computation costs.

At 430, the first device also generates a first set of nonces. At 435, the second device also generates a second set of nonces. The nonces are each one-time only random numbers. In one implementation, the nonces are each 160-bit random numbers. It is appreciated that the first and second sets of nonces are independently generated by the respective device and will probabilistically be composed of different random numbers. Use of one-time only random number nonces and a one-time-password protects against an attack that has acquired one or more password sub-strings and/or nonces from a previous session.

At 440, the first device generates a first set of authenticators ($HA_1$-$HA_N$) as a function of the first plurality of password sub-strings and the first set of nonces. At 445, the second device generates a second set of authenticators ($DA_1$-$DA_N$) as a function of the second plurality of password sub-strings and the second set of nonces. More specifically, each device generates its respective set of authenticators by hashing the respective set of nonces with the respective set of password sub-strings and the device identifier (e.g., Device IDs) and certificates (e.g., Device_Certificates) of the corresponding device. The certificate typically contains the device identifier of the certificate holder, a serial number, expiration dates and a copy of the certificate holder's public key. The device identifier is a string of bits that identifier the type of device.

The hash algorithm should produce the same output for the same input. It should be impractical to find a different input that will produce the same output or to deduce the input given the output. The hash algorithm should also be verifiable, such that when the input is revealed the authenticity of the revealed information can be verified. In one implementation, the password sub-strings are hashed utilizing a bit-commit cryptographic primitive. More particularly, a message authentication code (MAC) function, such as HMAC-SHA1 or the like may be utilized. The HMAC-SHA1 function takes a 160-bit random number key (e.g., nonce), a body of text (e.g., device identifier, device certificate and sub-string one-time-password) and produces a 160-bit message authentication code (MAC).

In the exchange of information stage, the devices exchange their respective set of authenticators. In particular, the first device outputs the first set of authenticators and its device identifier and certificate, at 450. The first set of authenticators and the device identifier and certificate of the first device are received by the second device, at 455. At 460, the second device outputs the second set of authenticators and its device identifier and certificate. Referring now to FIG. 5, the second set of authenticators and the device identifier and certificate of the second device are received by the first device, at 510.

In the validation stage, the devices verify that the other device's certificate was received intact and unaltered. Verification includes the step-wise revealing of information by the devices. In particular, the first device outputs (e.g., reveals) the first one of the nonces that it generated, its device identifier and certificate, at 515. The first nonce generated by the first device and the first device's identifier and certificate are received by the second device, at 520. At 525, the second device calculates a first validation parameter (e.g., recalculates the first authenticator received from the first device) based upon the first one of the password sub-strings that the second device possesses and the nonce, device identifier and certificate received at operation 520. At 530, the second device compares 250 the first validation parameter to the first one of the first set of authenticators received at operation 455.

At 535, the second device outputs (e.g., reveals) the first one of the nonces that it generated, its device identifier and certificate. Referring now to FIG. 6, the first nonce generated by the second device and the second device's identifier and certificate are received by the first device, at 610. At 615, the first device calculates a first validation parameter (e.g., recalculates the first authenticator received from the second device) based upon the first one of the password sub-strings that the first device possesses and the nonce, device identifier and certificate received at operation 610. At 620, the first device compares the first validation parameter to the first one of the second set of authenticators received at operation 510.

The operations of 515 to 620 are repeated, at 625 and 630, by the first and second devices for each of the authenticators. If each validation parameter matches the corresponding authenticator, mutual trust is established between the first and second devices at 635 and 640. If either the first or second device determines that any one of the validation parameters do not match the corresponding authenticator, the method may be aborted at the applicable operation or mutual trust may be rejected after completion of operations 405-630. Although not shown, the method may further include confirmation of the validation. The confirmation provides an affirmative communication of acceptance or rejection of trust by each device.

Figure 7:
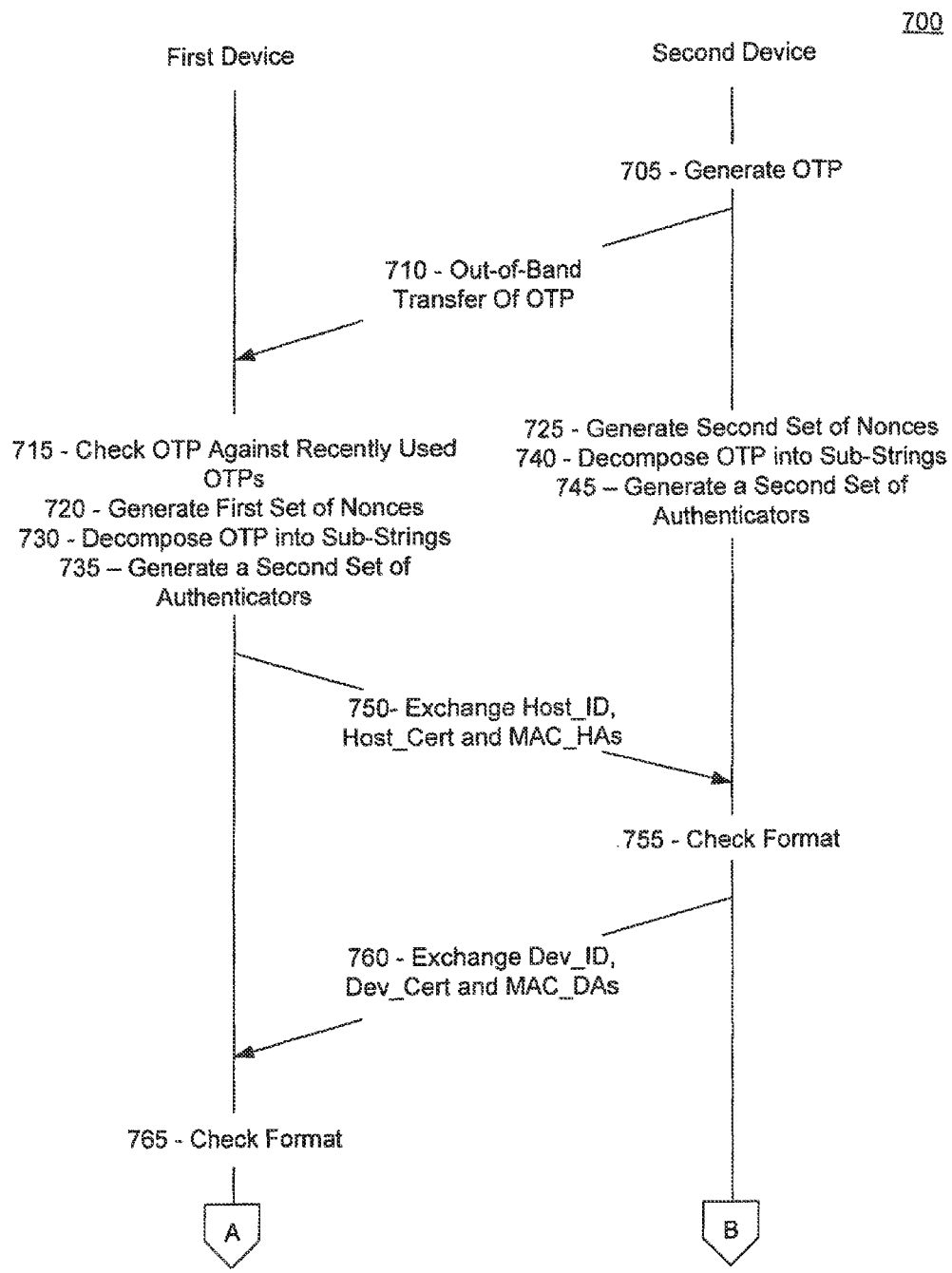
FIGS. 7, 8 and 9 show a flow diagram of another process of establishing secure mutual trust between a first and second device using an insecure password.
Figure 8:
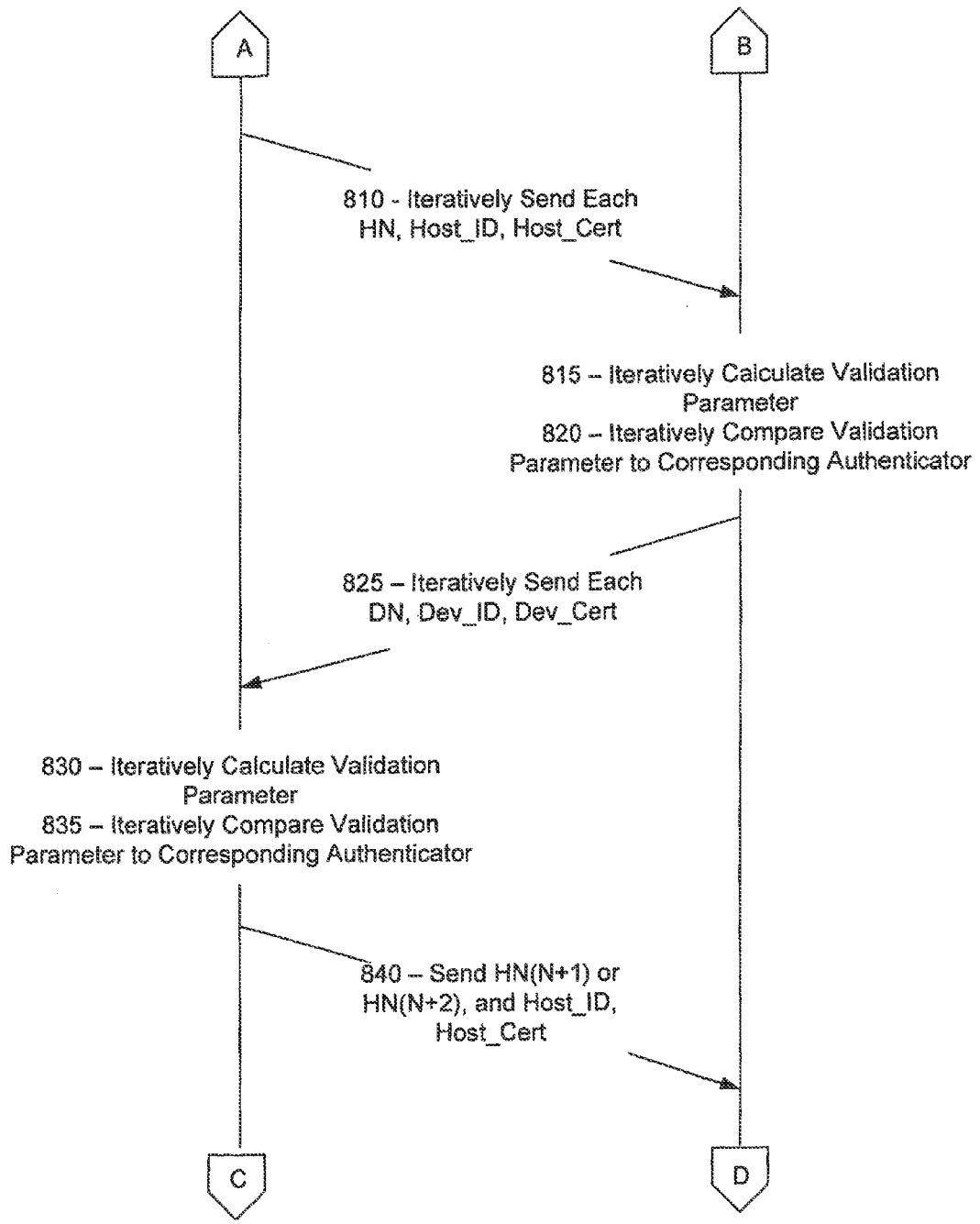
Figure 9:
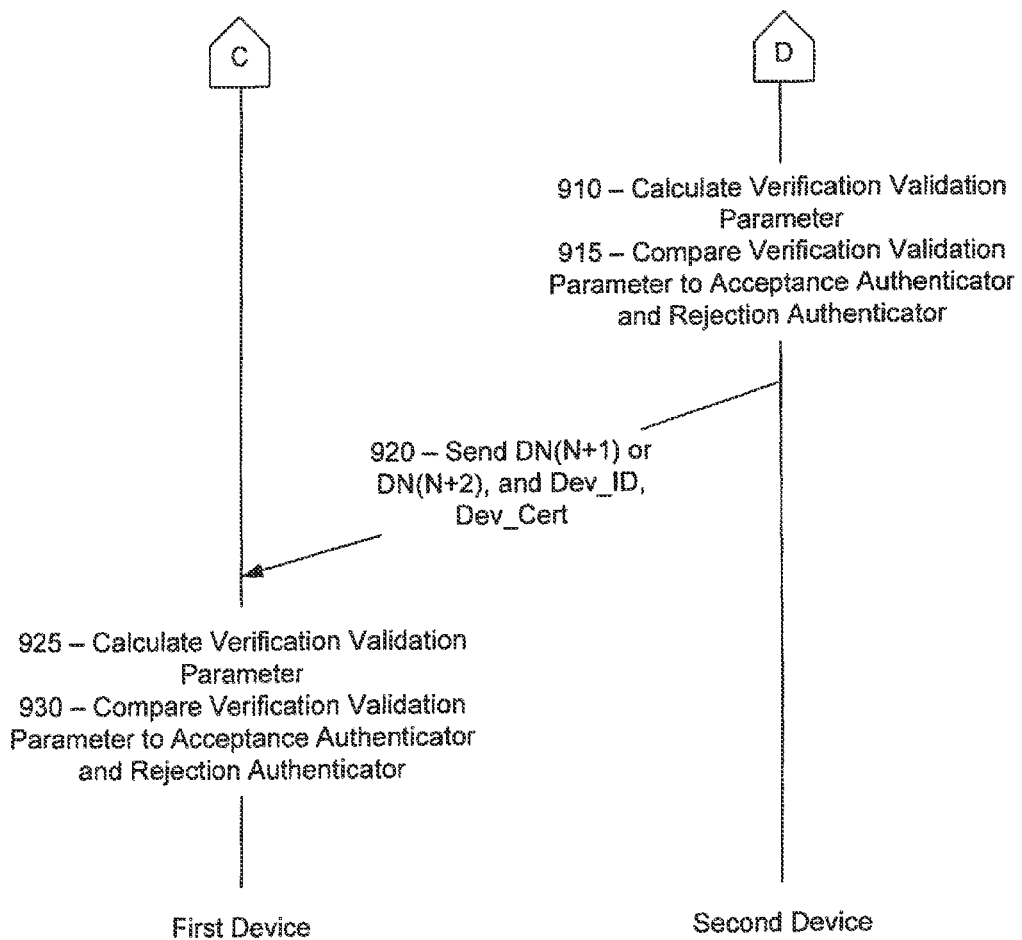
Figure 10:
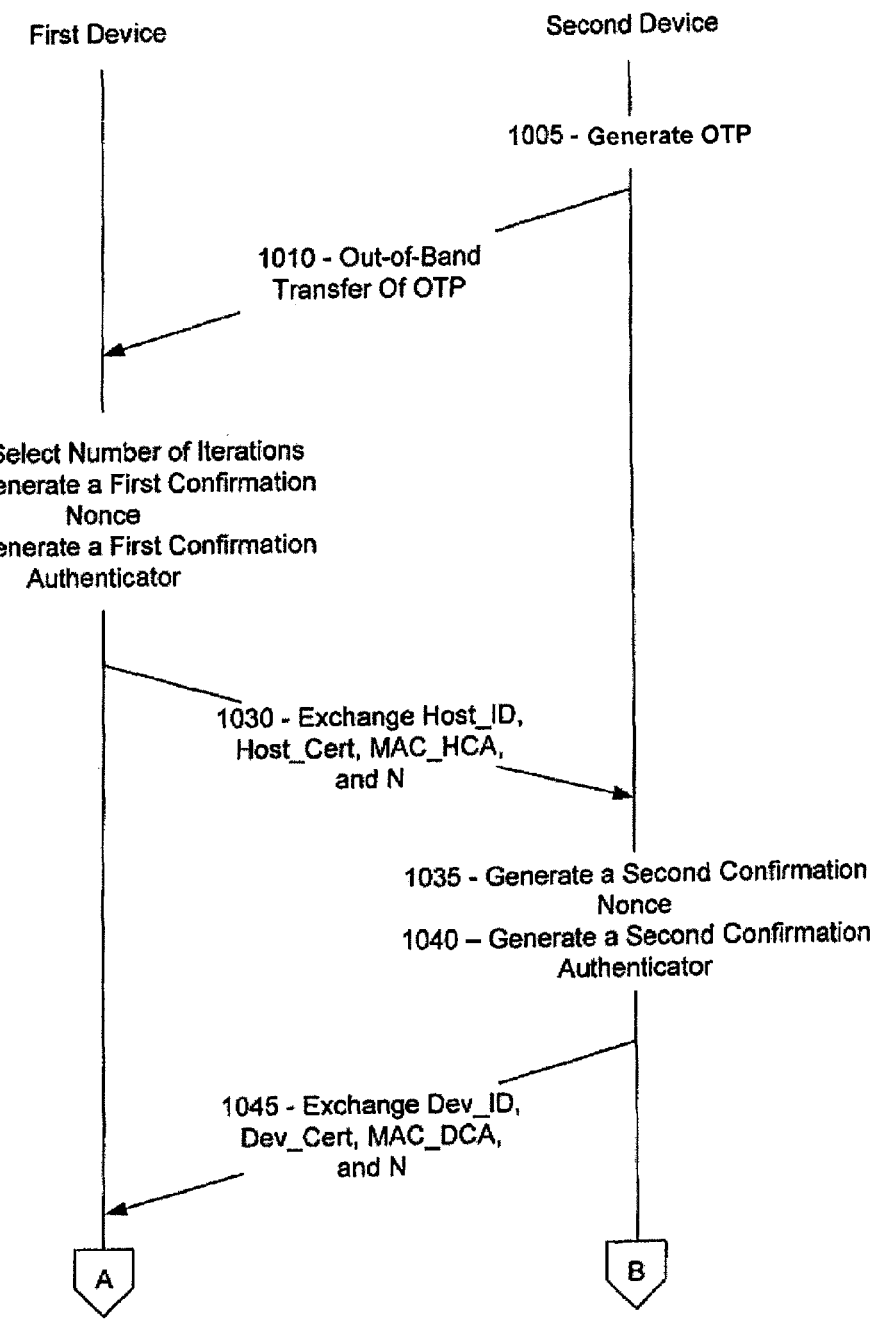
FIGS. 10, 11, 12 and 13 show a flow diagram of another process of establishing secure mutual trust between a first and second device using an insecure password.
Figure 11:
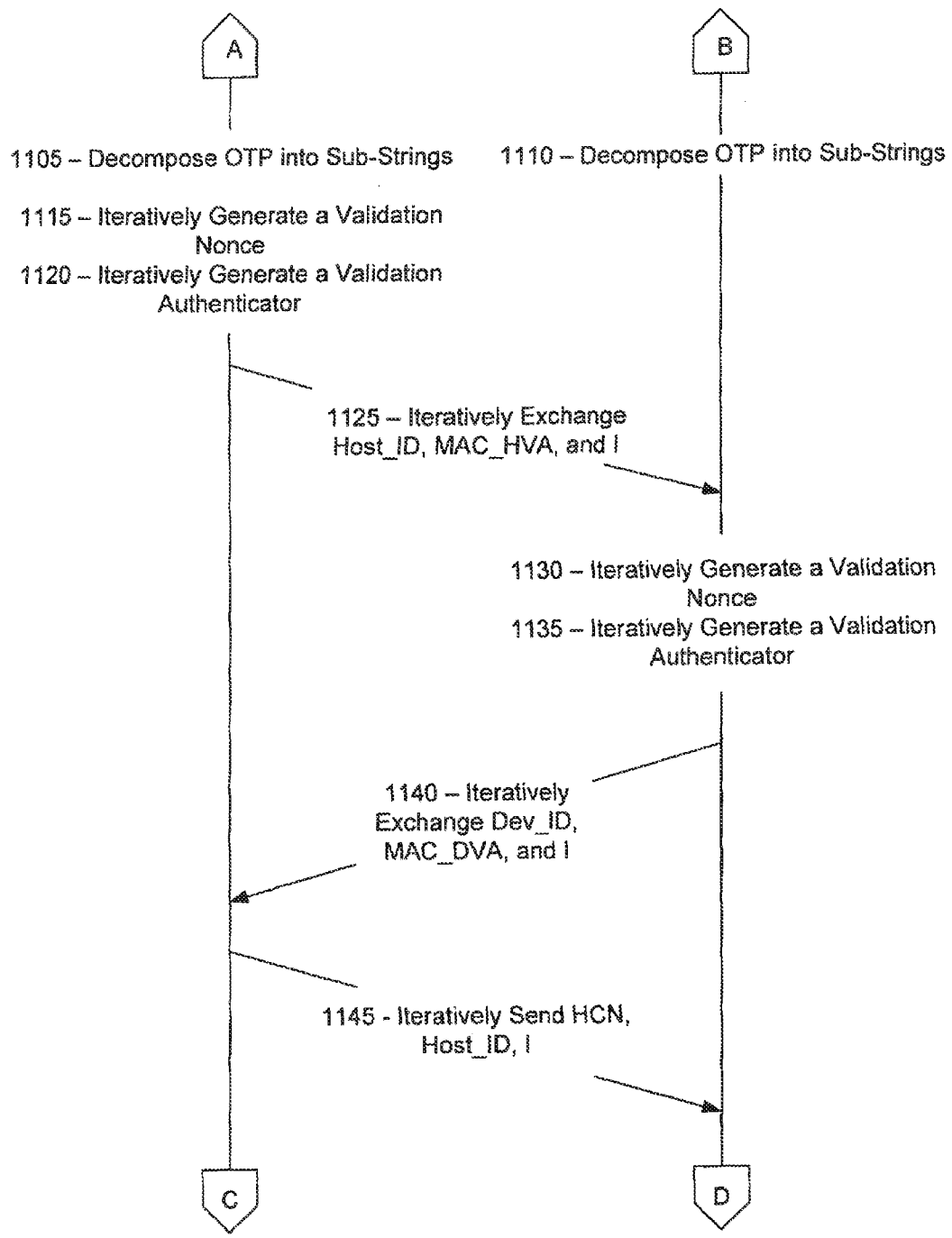

FIGS. 7, 8 and 9 show another process of establishing secure mutual trust between a first and second device using an insecure password. The process 700 begins with generation of a one-time-password (OTP) by the second device (e.g., endpoint device), at 705. The one-time-password may be randomly generated each time the process is initiated. The one-time-password may be a string of characters, numbers and/or the like. In one implementation, the one-time-password is a four digit decimal number. At 710, the one-time-password is transferred out-of-band from the second device to the first device. In one implementation, the out-of-band transfer entails an electronic appliance generating and displaying the one-time-password. A user then types the one-time-password into a personal computer implementing a home control point.

The first device may check the received one-time-password against a list of previously used OTPs, at 715. If the one-time-password has already been used, generation of a new one-time-password by the second device and subsequent out-of-band transfer of the one-time-password to the first device may be performed prior to continuation of the process.

The first device may generate a first plurality (e.g., N+2) of nonces ($HN_1$-$HN_{N+2}$), at 720. The second device may generate a second plurality (e.g., N+2) of nonces ($DN_1$-$DN_{N+2}$), at 725. The nonces may be cryptographically generated random numbers. It is appreciated that the nonces generated by the first device have a very high probability of being different from the nonces generated by the second device. In one implementation, each device generates a set of six nonces.

At 730, the first device decomposes the one-time-password into a plurality (e.g., N) of password sub-strings ($OTP_1$-$OTP_N$). In one implementation, the four digit decimal number of the one-time-password is decomposed by the first device into four sub-strings of one decimal digit each. At 735, the first device generates a first set of authenticators as a function of the password sub-strings, the first set of nonces, and the device identifier and certificate of the first device. In one implementation the certificate is an X509 V3 certificate or the like. The authenticators may be generated by hashing the respective password sub-strings, the nonces, the device identifier and certificates. The hash algorithm may be a bit-commit cryptographic primitive, such as an HMAC or the like. In particular, the first device generates a plurality of authenticators, denoted as:

$$MAC\_HA_1 = hmac(HN_1, OTP_1, HostID, HostCertificate)$$

$$MAC\_HA_2 = hmac(HN_2, OTP_2, HostID, HostCertificate)$$

$$\cdots$$

$$MAC\_HA_N = hmac(HN_N, OTP_N, HostID, HostCertificate)$$

$$MAC\_HA_A = hmac(HN_{N+1}, OTP, HostID, HostCertificate)$$

$$MAC\_HA_R = hmac(HN_{N+2}, OTP, HostID, HostCertificate)$$

The hmac function takes a 160-bit key ($HN_N$) and information ($OTP_N$, HostID, HostCertificate) and produces a 160-bit authentication code ($MAC\_HA_N$). The N authenticator values ($MAC\_HAC_1$ through $MAC\_HA_N$) are used in a corresponding round of the subsequent validation stage. The confirmation and rejection authenticators ($MAC\_HA_A$, $MAC\_HA_R$) may be calculated based upon the whole one-time-password and are utilized in the subsequent confirmation stage. In one implementation, the first device generates six authenticators for a validation stage implemented in four rounds.

At 740, the second device also decomposes the one-time-password into a plurality (e.g., N) of password sub-strings ($OTP_1$-$OTP_N$). In one implementation, the four digit decimal number of the one-time-password is decomposed by the second device into four password sub-strings of one decimal digit each. At 745, the second device generates a second set of authenticators as a function of the password sub-strings, the second set of nonces, and the device identifier and certificate of the second device. In particular, the second device generates a plurality of authenticators, denoted as:

$$MAC\_DA_1 = hmac(DN_1, OTP_1, DevID, DevCertificate)$$

$$MAC\_DA_2 = hmac(DN_2, OTP_2, DevID, DevCertificate)$$

$$\ldots$$

$$MAC\_DA_N = hmac(DN_N, OTP_N, DevID, DevCertificate)$$

$$MAC\_DA_A = hmac(DN_{N+1}, OTP, DevID, DevCertificate)$$

$$MAC\_DA_R = hmac(DN_{N+2}, OTP, DevID, DevCertificate)$$

Each authenticator value ($MAC\_DA_1$ through $MAC\_DA_N$) is used in a corresponding round of the subsequent validation stage. The $MAC\_DA_A$ or $MAC\_DA_R$ may be calculated based upon the whole one-time-password and are utilized in the subsequent confirmation stage.

In the exchange of information stage, the devices exchange their respective device identifiers, device certificates and set of authenticators. In particular, the first device transfers its device identifier, certificate and the first set of authenticators to the second device, at 750. At 755, the second device may check the format of the information received from the first device. If the format is valid, the process may continue. If the format is invalid, the process may be terminated or the second device may request that the first device resend the information.

At 760, the second device transfers its device identifier, certificate and the second set of authenticators to the first device. The first device may check the format of the information received from the second device, at 765. If the format is valid, the process may continue. If the format is invalid, the process may be terminated or the first device may request that the second device resend the information.

Accordingly, the one-time-password (e.g., a secret shared by both devices) is broken-up into a plurality of pieces. Hashing each of the pieces with a nonce effectively commits to the password sub-strings. The commitments are then exchanged so that the subsequent multistage reveal of the password can validate the authentication certificates.

In the validation stage, the devices step-wise reveal the one-time-password. More specifically, each device verifies that the other device knew the one-time-password when they generated and exchanged the authenticators. Referring now to FIG. 8, the first device sends the first nonce from the first set of nonces along with the first device's identifier and certificate, at 810. At 815, the second device calculates a first one of a first set of validation parameters by hashing (e.g., MAC) the first nonce received from the first device, the device identifier and certificate of the first device and the first password sub-string that the second device possesses. The second device validates that the first device knew the first password sub-string if the first validation parameter matches the first authenticator from the first set of authenticators received from the first device, at 820. If the second device validates that the first device knew the first sub-string one-time-password, the second device sends the first nonce from the second set of nonces along with the second device's identifier and certificate, at 825. At 830, the first device calculates a first one of a second set of validation parameters by hashing the first nonce received from the second device, the device identifier and certificate of the second device and the first password sub-string that the first device possesses. The first device validates that the second device knew the first password sub-string if the first validation parameter of the second set of validation parameters matches the first authenticator from the second set of authenticators received from the second device, at 835.

Procedures 810-835 are iteratively repeated to step-wise reveal each of the N password sub-strings. For each iteration, the given device to which the information has been revealed is able to verify that the other device knew each of the sub-strings and the authentication certificate when the devices generated and exchanged the authenticators. Accordingly, after all of the sub-strings of the password have been revealed by each device, the respective given device is able to verify that the other device received the device identifier and certificate of the given device intact and unaltered.

In the confirmation stage, each device provides an affirmative communication accepting or rejecting establishment of the trusted relationship. In particular, the first device indicates to the second device whether verification of the exchanged information has succeeded or failed by revealing either the acceptance nonce ($HN_{N+1}$) or rejection nonce ($HN_{N+2}$) along with the device identifier and certificate of the first device, at 840. Referring now to FIG. 9, the second device calculates a confirmation parameter based upon the revealed information, at 910. At 915, the confirmation parameter is compared to the acceptance authenticator ($MAC\_HC_A$) and the rejection authenticator ($MAC\_HC_R$). If the confirmation parameter matches the previously received acceptance authenticator, the second device knows that the first device has accepted establishment of the trust relationship. If the confirmation parameter matches the previously received rejection authenticator, the second device knows that the first device has rejected establishment of a trust relationship.

Similarly, the second device indicates to the first device whether verification of the exchanged information has succeeded or failed by revealing either the acceptance nonce ($DN_{N+1}$) or rejection nonce ($DN_{N+2}$) along with the device identifier and certificate of the first device, at 920. At 925, the first device calculates a confirmation parameter based upon the revealed information. At 930, the confirmation parameter is compared to the acceptance authenticator ($MAC\_DC_A$) and the rejection authenticator ($MAC\_DC_R$). If the confirmation parameter matches the previously received acceptance authenticator, the first device knows that the second device has accepted establishment of the trust relationship. If the confirmation parameter matches the previously received rejection authenticator, the first device knows that the second device has rejected establishment of a trust relationship.

FIGS. 10, 11, 12 and 13 show another process of establishing secure mutual trust between a first and second device using an insecure password. The process begins with generation of a one-time-password (OTP) by the second device, at 1005. The one-time-password may be randomly generated each time the process is initiated. The one-time-password may be a string of characters, numbers and/or the like. In one implementation, the one-time-password is a four digit decimal number.

At 1010, the one-time-password is transferred out-of-band from the second device to the first device. In one implementation, an end point device, such as a home appliance, generates and displays the one-time-password. A user then types the one-time-password into a personal computer implementing a home control point. The first device may check the received one-time-password against a list of previously used OTPs. If the one-time password has already been used, the out-of-band transfer may be retried a limited number of times and/or the process may be aborted. If the one-time-password has not already been used, it may be added to a list of previously used one-time-passwords and the process may proceed forward.

At 1015, the first device selects a number of iterations to performing the subsequent commit and validation process. At 1020, the first device also generates a first confirmation nonce. The first confirmation nonce may be a cryptographically generated random number. The first device then generates a first confirmation authenticator as a function of the one-time-password and the first confirmation nonce, at 1025. The first confirmation authenticator may also be generated as a function of the specified iteration count, the first device's identifier, the first device's certificate and/or the like. In one implementation, the first confirmation authenticator is generated by hashing the one-time-password, the confirmation nonce, the specified iteration count, the device identifier and the device certificate. The hash algorithm may be a bit-commit cryptographic primitive, such as an HMAC or the like. In particular, the first confirmation authenticator (MAC_HCA) may be specified as:

$$MAC\_HCA=hmac(HCN,OTP,\text{HostID},\text{HostCertificate},N)$$

Wherein HCN is the first confirmation nonce, OTP is the one-time-password, HostID is the device identifier of the first device, HostCertificate is the certificate of the first device and N is the specified iteration count.

At 1030, the first device transfers its device identifier, certificate and the first confirmation authenticator to the second device. The second device may check the format of the confirmation authenticator received from the first device. If the format is valid, the process may continue. If the format is invalid, the transfer may be retried a limited number of times and/or aborted.

At 1035, the second device generates a second confirmation nonce. The second confirmation nonce may be a cryptographically generated random number. The second device then generates a second confirmation authenticator as a function of the one-time-password and the second confirmation nonce, at 1040. The second confirmation authenticator may also be generated as a function of the specified iteration count, the second device's identifier, the second device's certificate and/or the like. In one implementation, the second confirmation authenticator is generated by hashing the one-time-password, the confirmation nonce, the specified iteration count, the device identifier and the device certificate. The hash algorithm may be a bit-commit cryptographic primitive, such as an HMAC or the like. In particular, the second confirmation authenticator (MAC_DCA) may be specified as:

$$MAC\_DCA=hmac(DCN,OTP,\text{DevID},\text{DevCertificate},N)$$

Wherein DCN is the second confirmation nonce, OTP is the one-time-password, HostID is the device identifier of the second device, HostCertificate is the certificate of the second device and N is the specified iteration count.

At 1045, the second device transfers its device identifier, certificate and the second confirmation authenticator to the first device. The first device may check the format of the confirmation authenticator received from the second device. If the format is valid, the process may continue. If the format is invalid, the transfer may be retried a limited number of times and/or aborted.

At 1105 and 1110, the first and second devices respectively decompose the one-time-password into a plurality of password sub-strings. The number of password sub-strings is equal to the selected number of iterations. At 1115, the first device generates a validation nonce for the corresponding iteration of a commit and validation phase. The nonce may be a cryptographically generated random number. At 1120, the first device generates a validation authenticator for the given iteration as a function of a corresponding one of the password sub-strings and the nonce generated by the first device. The validation authenticator may also be generated as a function of the corresponding iteration count, the first device's identifier, the first device's certificate and/or the like. In one implementation, the validation authenticator is generated by hashing the respective password sub-strings, the respective validation nonce, the device identifier, the device certificate and the respective iteration value. The hash algorithm may be a bit-commit cryptographic primitive, such as an HMAC or the like. In particular, the validation authenticator (MAC_HVA$_I$) generated by the second device for the given iteration may be specified as:

$$MAC\_HVA_I=hmac(HN_I,OTP_I,\text{HostID},\text{HostCertificate},I)$$

Wherein N is the total number of iterations, I is the value corresponding to the given iteration, HN$_I$ is the respective validation nonce and OTP$_I$ is the respective password sub-string.

At 1125, the first device transfers its device identifier, certificate and the validation authenticator corresponding to the particular iteration to the second device. The second device may check the format of the validation authenticators. If the format is valid, the process continues. If the format is invalid, the transfer may be attempted a limited number of times and/or aborted.

At 1130, the second device generates a respective validation nonce for the corresponding iteration of the commit and validation phase. At 1135, the second device generates a validation authenticator for the given iteration as a function of the corresponding password sub-string and the nonce generated by the second device. The validation authenticator may also be generated as a function of the corresponding iteration count, the second device's identifier, the second device's certificate and/or the like. In one implementation, the validation authenticator is generated by hashing the respective password sub-string, the respective validation nonce, the device identifier, the device certificate and the respective iteration value. In particular, the validation authenticator (MAC_DVA$_I$) generated by the second device for a given iteration may be specified as:

$$MAC\_DVA_I=hmac(DN_I,OTP_I,\text{DevID},\text{DevCertificate},I)$$

Wherein N is the total number of iterations, I is the value corresponding to a given iteration, DN$_I$ is the respective validation nonce and OTP$_I$ is the respective password sub-string.

Figure 12:
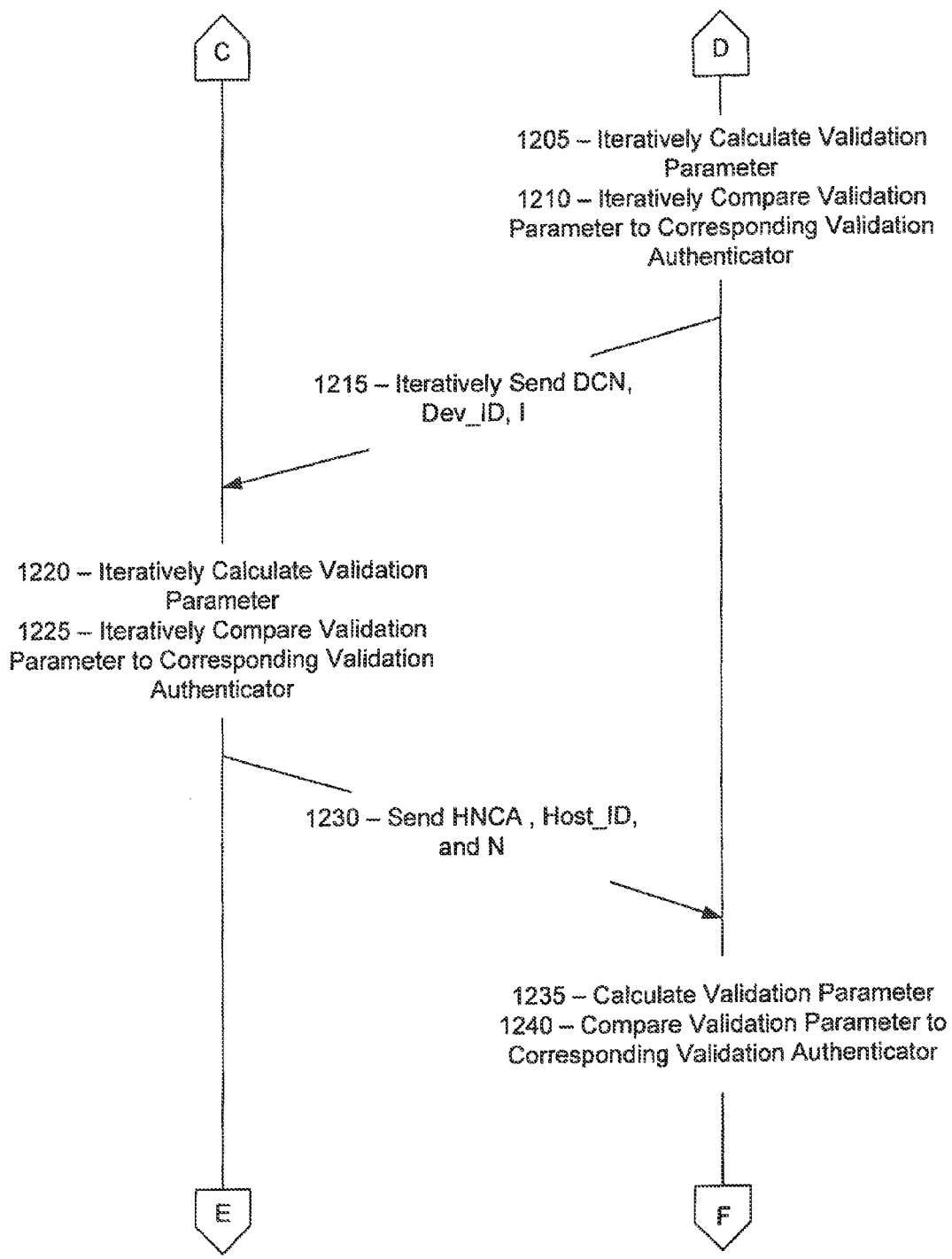
Figure 13:
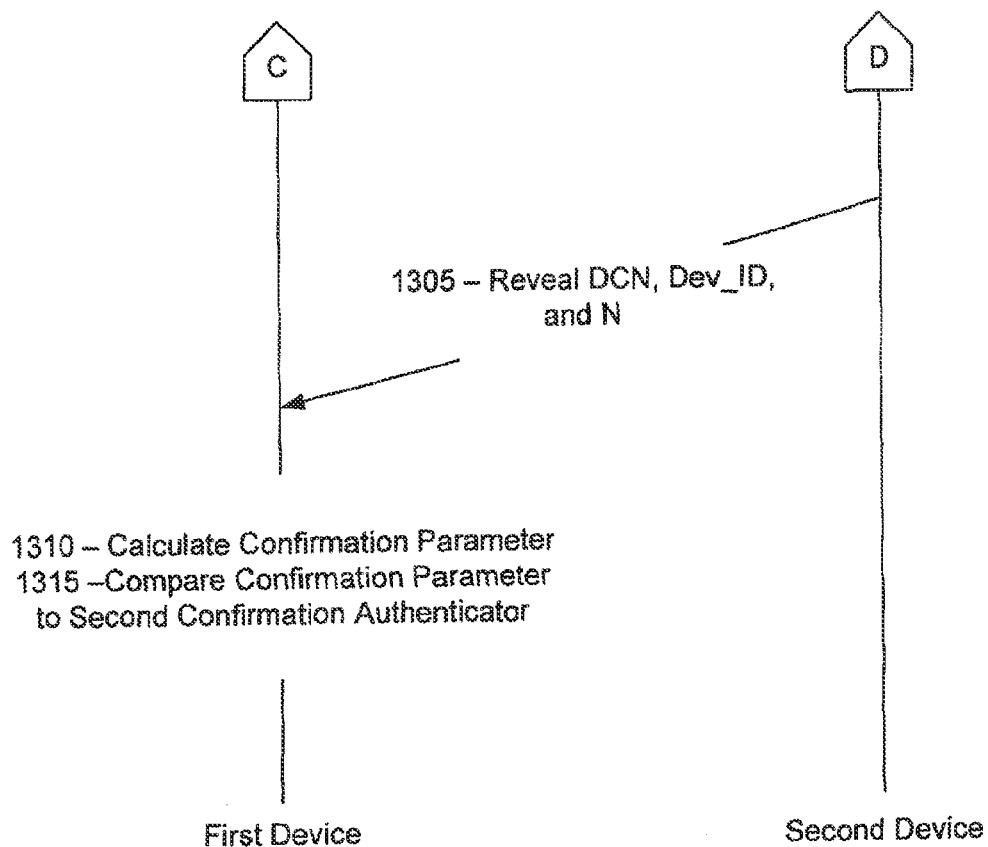

At 1140, the second device transfers its device identifier, certificate and the validation authenticator corresponding to the particular iteration to the first device. The first device may check the format of the validation authenticators. If the format is valid, the process continues. If the format is invalid, the transfer may be retried a limited number of times and/or aborted At 1145, the first device reveals the respective validation nonce that it generated along with the first device's identifier and the corresponding iteration value. Referring now to FIG. 12, the second device calculates a validation parameter by hashing the validation nonce, device identifier and iteration value received from the first device and the password sub-string corresponding to the given iteration that the second device possesses, at 1205. At 1210, the second device validates that the first device knew the first password sub-string if the validation parameter matches the validation authenticator received from the first device for the given iteration.

If the second device validates that the first device knew the first sub-string, the second device reveals the respective validation nonce that it generated along with the second device's identifier and the corresponding iteration value, at 1215. At 1220, the first device calculates a validation parameter by hashing the validation nonce, the device identifier and the iteration value received from the second device and the password sub-string corresponding to the given iteration that the first device possesses. The first device validates that the second device knew the first password sub-string if the validation parameter matches the validation authenticator received from the second device for the given iteration, at 1225.

Procedures 1115-1225 are iteratively repeated to step-wise commit and subsequently reveal each of the N password sub-strings. For each iteration, the given device to which the information has been revealed is able to verify that the other device knew the corresponding password sub-string when the device generated and exchanged the validation authenticators. Accordingly, after all of the sub-strings of the password have been revealed by each device, the respective given device is able to verify that the other device received the device identifier and certificate of the given device intact and unaltered.

If all of the validation authenticators are verified, the first device reveals the first confirmation nonce, its device identifier and the iteration count, at 1230. The second device calculates a first confirmation parameter by hashing the first confirmation nonce, device identifier and iteration count received from the first device and the one-time-password that the second device possesses, at 1235. At 1240, the second device verifies that the confirmation parameter matches the first confirmation authenticator previously received from the first device. If the first confirmation authenticator is verified, the second device reveals the second confirmation nonce, its device identifier and the iteration count, at 1305. At 1310, the first device calculates a second confirmation parameter by hashing the second confirmation nonce, device identifier and iteration count received from the second device and the one-time-password that the first device possesses. At 1315, the first device verifies that the confirmation parameter matches the second confirmation authenticator previously received from the second device. If both of the confirmation authenticators are verified, secure mutual trust is established between the first and second devices.

Figure 14:
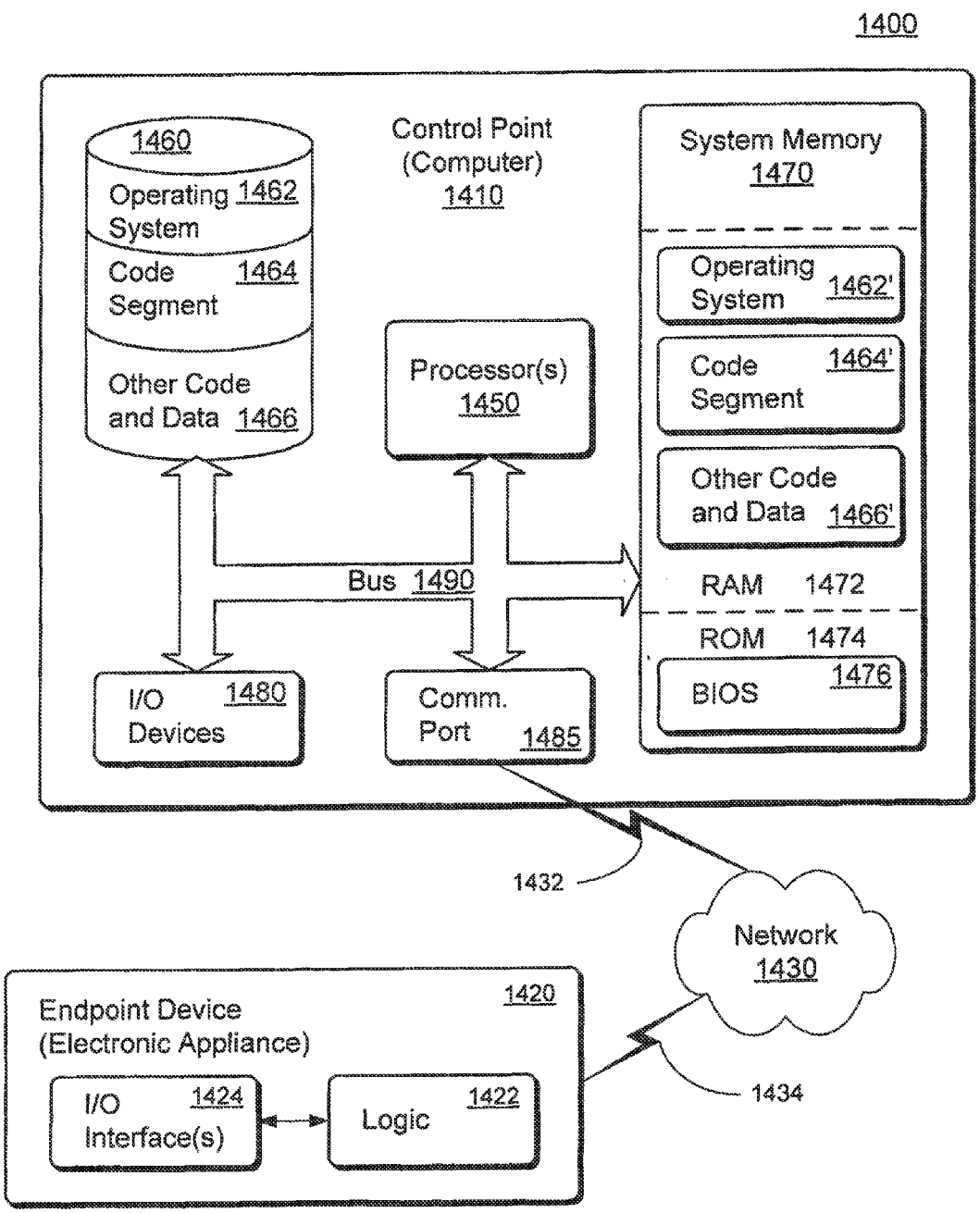
FIG. 14 shows a block diagram of an exemplary operating architecture for implementing secure mutual trust between two devices using an insecure password.

FIG. 14 shows an exemplary operating architecture 1400 for implementing secure mutual trust between two devices using an insecure password. The exemplary operating environment 1400 includes a control point device 1410, and one or more endpoint devices 1420 communicatively coupled to the control point device 1410. The control point device 1410 and the endpoint devices 1420 may include one or more personal computers, server computers, client computers, hand-held or laptop devices, set top boxes, programmable consumer electronics and/or the like.

An exemplary control point device 1410 or endpoint device 1420 may include one or more processors 1450, one or more computer-readable media 1460, 1470 and one or more input/output devices 1480, 1485. The computer-readable media 1460, 1470 and input/output devices 1480, 1485 may be communicatively coupled to the one or more processors 1450 by one or more buses 1490. The one or more buses 1490 may be implemented using any kind of bus architectures or combination of bus architectures, including a system bus, a memory bus or memory controller, a peripheral bus, an accelerated graphics port and/or the like. The one or more buses 1490 provide for the transmission of computer-readable instructions, data structures, program modules, code segments and other data encoded in one or more modulated carrier waves. Accordingly, the one or more buses 1490 may also be characterized as computer-readable media.

The input/output devices 1480, 1485 may include one or more communication ports 1485 for communicatively coupling the exemplary device 1410 to the other devices 1420. One or more of the other devices 1420 may be directly coupled to one or more of the communication ports 1485 of the exemplary device 1410. In addition, one or more of the other devices 1420 may be indirectly coupled through a network 1430 to one or more of the communication ports 1485 of the exemplary device 1410. The networks 1430 may include an intranet, an extranet, the Internet, a wide-area network (WAN), a local area network (LAN), and/or the like.

The communication ports 1485 of the exemplary device 1410 may include any type of interface, such as a network adapter, modem, radio transceiver, or the like. The communication ports may implement any connectivity strategies, such as broadband connectivity, modem connectivity, digital subscriber link (DSL) connectivity, wireless connectivity or the like. The communication ports 1485 and the communication channels 1432, 1434 that couple the devices 1410, 1420 provide for the transmission of computer-readable instructions, data structures, program modules, code segments, and other data encoded in one or more modulated carrier waves (e.g., communication signals) over one or more communication channels 1432, 1434. Accordingly, the one or more communication ports 1485 and/or communication channels 1432, 1434 may also be characterized as computer-readable media.

The exemplary device 1410 may also include additional input/output devices 1480, such as one or more display devices, keyboards, and pointing devices (e.g., a "mouse"). The input/output devices may further include one or more speakers, microphones, printers, joysticks, game pads, satellite dishes, scanners, card reading devices, digital and video cameras or the like. The input/output devices 1480 may be coupled to the bus 1490 through any kind of input/output interface and bus structures, such as a parallel port, serial port, game port, universal serial bus (USB) port, video adapter or the like.

The computer-readable media 1460, 1470 may include system memory 1470 and one or more mass storage devices 1460. The mass storage devices 1460 may include a variety of types of volatile and non-volatile media, each of which can be removable or non-removable. For example, the mass storage devices 1460 may include a hard disk drive for reading from and writing to non-removable, non-volatile magnetic media. The one or more mass storage devices 1460 may also include a magnetic disk drive for reading from and writing to a removable, non-volatile magnetic disk (e.g., a "floppy disk"), and/or an optical disk drive for reading from and/or writing to a removable, non-volatile optical disk such as a compact disk (CD), digital versatile disk (DVD), or other optical media. The mass storage devices 1460 may further include other types of computer-readable media, such as magnetic cassettes or other magnetic storage devices, flash memory cards, electrically erasable programmable read-only memory (EEPROM), or the like. Generally, the mass storage devices 1460 provide for non-volatile storage of computer-readable instructions, data structures, program modules, code segments, and other data for use by the exemplary device. For instance, the mass storage device 1460 may store the operating system 1462, code segments 1464 for establishing secure mutual trust using an insecure password, and other code and data 1466.

The system memory 1470 may include both volatile and non-volatile media, such as random access memory (RAM) 1472, and read only memory (ROM) 1474. The ROM 1474 typically includes a basic input/output system (BIOS) 1476 that contains routines that help to transfer information between elements within the exemplary device 1410, such as during startup. The BIOS 1476 instructions executed by the processor 1450, for instance, causes the operating system 1462 to be loaded from a mass storage device 1460 into the RAM 1472. The BIOS 1476 then causes the processor 1450 to begin executing the operating system 1462' from the RAM 1472. The code segment 1464 for establishing mutual trust may then be loaded into the RAM 1472 under control of the operating system 1462'.

The processor 1450 of the exemplary device 1410 executes the various instructions of the code segment 1464' to establish secure mutual trust between the exemplary device 1410 and another device 1420 using an insecure password. In particular, the code segment 1464' may either generate a one-time-password which is output for an out-of-band transfer to the other device 1420, or the code segment may receive a one-time-password via an out-of-band transfer. The code segment 1464' generates a first set of authenticators as a function of the one-time-password and the device's 1410 authentication certificate. The code segment 1464' iteratively transfers the first set of authenticators to the other device 1420 and receives a second set of authenticators from the other device 1420. The received authenticators and the one-time-password 1466' may be stored in RAM 1472. The code segment 1464' then iteratively reveals information such that each of a plurality of sub-strings of the one-time-password may be verified by the other device 1420. The code segment 1464' verifies that the other device knew the sub-string and the authentication certificate as a function of information revealed by the other device 1420. In addition, the code segment 1464' may also reveal information such that the other device 1420 may determine if validation has been confirmed by the code segment 1464'. The code segment 1464' may also verify that the other device 1420 has confirmed validation.

Generally, any of the functions, processes of establishing secure mutual trust using an insecure password described above can be implemented using software, firmware, hardware, or any combination of these implementations. The term "logic, "module" or "functionality" as used herein generally represents software, firmware, hardware, or any combination thereof. For instance, in the case of a software implementation, the term "logic," "module," or "functionality" represents computer-executable program code that performs specified tasks when executed on a computing device or devices. The program code can be stored in one or more computer-readable media (e.g., computer memory). It is also appreciated that the illustrated separation of logic, modules and functionality into distinct units may reflect an actual physical grouping and allocation of such software, firmware and/or hardware, or can correspond to a conceptual allocation of different tasks performed by a single software program, firmware routine or hardware unit. The illustrated logic, modules and functionality can be located at a single site, or can be distributed over a plurality of locations.

It is further appreciated that the described control point device 1410 is only one example of a suitable implementation and is not intended to suggest any limitations as to the scope of use or functionality of the invention. The computing systems, electronic devices, environments and/or configurations suitable for use with the invention may be implemented in hardware, software, firmware or any combination thereof. For example, one or more devices may implement the process of establishing secure mutual trust utilizing a logic circuit 1422 (e.g., hardware and/or firmware) communicatively coupled between an input/output interface 1424 and a communication channel 1434 of the network 1430. Neither should the operating architecture be interpreted as having any dependency or requirement relating to any one component or combination of components illustrated in the exemplary operating architecture 1400.

It is appreciated from the above description that embodiments may advantageously be utilized to establish two-way trusted communications. The multi-step process of establishing mutual trust uses an insecure password to exchange full authentication certificates. Embodiments use the relatively short password to achieve a relatively high level of security utilizing a multistage iterative technique for exchanging authentication certificate. The password is insecure in the sense that it is short, not that it is easily stolen. Accordingly, the multi-step process of establishing mutual trust advantageously mitigates man-in-the-middle attacks.

The foregoing descriptions of specific embodiments have been presented for purposes of illustration and description. Numerous specific details were set forth in the detail description in order to provide a thorough understanding. However, it is understood that the present invention may be practiced without these specific details. In other instances, well-known methods, procedures, components, and circuits were not described in detail so as not to unnecessarily obscure aspects of the invention. The described embodiments are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of establishing trust between a first device and a second device, comprising:
   generating, by the first device, a first set of n password substrings from a one-time-password known to the second device, wherein n is an integer greater than one;
   receiving n received authenticators from the second device, wherein a first received authenticator of the n received authenticators is a cryptographic encoding comprising a first nonce of n nonces and a first password substring of a second set of n password substrings generated by the second device;
   receiving the n nonces from the second device;
   generating, by the first device, n corresponding authenticators, wherein each of the n corresponding authenticators is a cryptographic encoding comprising one of the nonces of the n nonces and one of the password substrings of the first set of n password substrings, wherein a first corresponding authenticator of the n corresponding authenticators is a cryptographic encoding comprising a first nonce of the n nonces and a first password substring of the first set of n password substrings;
   verifying that each received authenticator of the n received authenticators matches a corresponding authenticator of the n corresponding authenticators including verifying that the first corresponding authenticator matches the first received authenticator; and
   establishing trust between the first device and the second device after each received authenticator of the n received authenticators has been verified.

2. The method of claim 1, wherein each received authenticator of the n received authenticators is received individually from the second device, wherein each nonce of the n nonces is received individually from the second device, wherein one of the n corresponding authenticators is generated for each received nonce, and wherein each received authenticator is matched to one of the n corresponding authenticators before a next received authenticator of the n received authenticators and a next nonce of the n nonces are received.

3. The method of claim 1, wherein the verification step is conducted n times.

4. The method of claim 1, further comprising:
sending a confirmation to the second device after verifying that each received authenticator of the n received authenticators matches a corresponding authenticator of the n corresponding authenticators.

5. The method of claim 1, further comprising:
generating, by the first device, a second set of n nonces; and
generating, by the first device, n generated authenticators, wherein each generated authenticator is a cryptographic encoding comprising one nonce of the second set of n nonces and one password substring of the first set of n password substrings.

6. The method of claim 5, further comprising:
sending each generated authenticator of the n generated authenticators to the second device; and
sending each nonce of the second set of n nonces to the second device.

7. The method of claim 6, further comprising:
receiving a confirmation from the second device after verification of each generated authenticator of the n generated authenticators; and
establishing secure mutual trust between the first device and the second device when each received authenticator of the n received authenticators has been verified by the first device and each generated authenticator of the n generated authenticators has been verified by the second device.

8. The method of claim 1, wherein the cryptographic encoding of each received authenticator of the n received authenticators further comprises a second device identifier.

9. A computer system comprising a first device and a second device, the first device comprising:
one or more processors;
a memory storing computer-readable instructions that when executed by the one or more processors perform a method of establishing trust between the first device and the second device, the method comprising:
generating, by the first device, a first set of n password substrings from a one-time-password known to the second device, wherein n is an integer greater than one;
receiving a first authenticator of n received authenticators from the second device, wherein the first authenticator is a cryptographic encoding comprising a first nonce of a set of n nonces and a first password substring of a second set of n password substrings generated by the second device;
receiving the first nonce of the set of n nonces from the second device;
generating, by the first device, a first corresponding authenticator of n corresponding authenticators, wherein the first corresponding authenticator is a cryptographic encoding comprising the first nonce and a first password substring of the first set of n password substrings, and wherein each corresponding authenticator of the n corresponding authenticators is a cryptographic encoding of one nonce of the n nonces and one password substring of the first set of n password substrings;
verifying that the first received authenticator matches the first corresponding authenticator;
receiving a next authenticator of the n received authenticators and a next nonce of the n nonces from the second device, wherein the next authenticator is a cryptographic encoding comprising the next nonce of the set of n nonces and a next password substring of the second set of n password substrings generated by the second device;
generating, by the first device, a next corresponding authenticator of the n corresponding authenticators, wherein the next corresponding authenticator is a cryptographic encoding comprising the next nonce and a next password substring of the first set of n password substrings;
verifying that the next received authenticator matches the next corresponding authenticator; and
establishing trust between the first device and the second device when each received authenticator of the n received authenticators has been verified.

10. The computer system of claim 9, further comprising:
repeating the verification step until each of the n received authenticators has been verified.

11. The computer system of claim 9, wherein steps are conducted in any order.

12. The computer system of claim 9, further comprising:
sending a confirmation to the second device after verifying that each received authenticator of the n received authenticators matches a corresponding authenticator of the n corresponding authenticators.

13. The computer system of claim 9, further comprising:
generating, by the first device, a second set of n nonces; and
generating, by the first device, n generated authenticators, wherein each generated authenticator is a cryptographic encoding comprising one nonce of the second set of n nonces and one password substring of the first set of n password substrings.

14. The computer system of claim 13, further comprising:
sending each generated authenticator of the n generated authenticators to the second device; and
sending each nonce of the second set of n nonces to the second device.

15. The computer system of claim 14, further comprising:
receiving a confirmation from the second device after verification of each generated authenticator of the n generated authenticators; and
establishing secure mutual trust between the first device and the second device when each received authenticator of the n received authenticators has been verified by the first device and each generated authenticator of the n generated authenticators has been verified by the second device.

16. The computer system of claim 9, wherein the cryptographic encoding of each received authenticator of the n received authenticators further comprises a second device identifier.

17. A computer medium not consisting of a propagated data signal, the computer medium storing instructions that when executed by one or more processors configure the one or more processors to perform a method of establishing trust between a first device and a second device, the method comprising:

generating, by the first device, a first set of n password substrings from a one-time-password known to the second device, wherein n is an integer greater than one;

receiving n received authenticators from the second device, wherein a first received authenticator of the n received authenticators is a cryptographic encoding comprising a first nonce of n nonces and a first password substring of a second set of n password substrings generated by the second device;

receiving the n nonces from the second device;

generating, by the first device, n corresponding authenticators, wherein each of the n corresponding authenticators is a cryptographic encoding comprising one of the nonces of the n nonces and one of the password substrings of the first set of password substrings, wherein a first corresponding authenticator of the n corresponding authenticators is a cryptographic encoding comprising a first nonce of the n nonces and a first password substring of the first set of n password substrings;

verifying that each received authenticator of the n received authenticators matches a corresponding authenticator of the n corresponding authenticators including verifying that the first corresponding authenticator matches the first received authenticator; and establishing trust between the first device and the second device after each received authenticator of the n received authenticators has been verified.

18. The computer medium of claim 17, wherein each received authenticator of the n received authenticators is received individually from the second device, wherein each nonce of the n nonces is received individually from the second device, wherein one of the n corresponding authenticators is generated for each received nonce, and wherein each received authenticator is matched to one of the n corresponding authenticators before a next received authenticator of the n received authenticators and a next nonce of the n nonces are received.

19. The computer medium of claim 17, further comprising:

generating, by the first device, a second set of n nonces; and generating, by the first device, n generated authenticators, wherein each generated authenticator is a cryptographic encoding comprising one nonce of the second set of n nonces and one password substring of the first set of n password substrings.

20. The computer medium of claim 19, further comprising:

sending each generated authenticator of the n generated authenticators to the second device;

sending each nonce of the second set of n nonces to the second device; and establishing secure mutual trust between the first device and the second device when each received authenticator of the n received authenticators has been verified by the first device and each generated authenticator of the n generated authenticators has been verified by the second device.

* * * * *